US012189206B2

(12) United States Patent
Su et al.

(10) Patent No.: US 12,189,206 B2
(45) Date of Patent: *Jan. 7, 2025

(54) IMAGING CAMERA DRIVING MODULE AND ELECTRONIC DEVICE

(71) Applicant: LARGAN DIGITAL CO., LTD., Taichung (TW)

(72) Inventors: Heng Yi Su, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,920

(22) Filed: Apr. 10, 2023

(65) Prior Publication Data

US 2023/0244057 A1  Aug. 3, 2023

Related U.S. Application Data

(63) Continuation of application No. 16/931,331, filed on Jul. 16, 2020, now Pat. No. 11,650,392.

(30) Foreign Application Priority Data

May 22, 2020 (TW) .................................. 109117093

(51) Int. Cl.
G02B 27/64 (2006.01)
G02B 7/08 (2021.01)
G03B 5/00 (2021.01)
H04N 23/68 (2023.01)

(52) U.S. Cl.
CPC ............. *G02B 7/08* (2013.01); *G02B 27/646* (2013.01); *G03B 5/00* (2013.01); *H04N 23/6812* (2023.01); *G03B 2205/0015* (2013.01); *G03B 2205/0069* (2013.01); *G03B 2217/005* (2013.01)

(58) Field of Classification Search
None
See application file for complete search history.

(56) References Cited

U.S. PATENT DOCUMENTS

| | | | |
|---|---|---|---|
| 7,991,278 | B2 | 8/2011 | Chiang |
| 8,233,083 | B2 | 7/2012 | Takatsuka et al. |
| 8,363,150 | B2 | 1/2013 | Ming et al. |
| 8,406,617 | B2 | 3/2013 | Yanagisawa et al. |

(Continued)

*Primary Examiner* — Clayton E. LaBalle
*Assistant Examiner* — Diana Hancock
(74) *Attorney, Agent, or Firm* — Maschoff Brennan

(57) ABSTRACT

An imaging camera driving module includes a lens unit, a driving mechanism, a sensing mechanism and an image surface. At least a part of the driving mechanism is coupled to the lens unit to drive the lens unit to move in a direction parallel to the optical axis. The sensing mechanism includes sensing magnets fixed to the lens unit and sensing elements not facing the driving mechanism. The sensing elements are disposed on an image side of the imaging lens assembly of the lens unit and corresponding to the sensing magnets. The sensing elements are configured to detect a relative position of the sensing magnets. The image surface is disposed on the image side of the imaging lens assembly, and the optical axis passes through the image surface. The sensing mechanism is configured to detect a tilt of the optical axis with respect to the central axis.

15 Claims, 29 Drawing Sheets

(56) References Cited

U.S. PATENT DOCUMENTS

| | | |
|---|---|---|
| 8,446,476 B2 | 5/2013 | Ku |
| 8,711,497 B2 | 4/2014 | Machida et al. |
| 8,810,714 B2 | 8/2014 | Seol et al. |
| 8,903,230 B2 | 12/2014 | Shikama et al. |
| 9,036,260 B2 | 5/2015 | Sugawara |
| 9,134,587 B2 | 9/2015 | Lim et al. |
| 9,377,670 B2 | 6/2016 | Chan |
| 9,465,231 B2 | 10/2016 | Hu et al. |
| 9,477,093 B2 | 10/2016 | Moriya et al. |
| 9,516,212 B2 | 12/2016 | Kang et al. |
| 10,288,835 B2 | 5/2019 | Park |
| 10,401,591 B2 | 9/2019 | Tseng |
| 11,650,392 B2 * | 5/2023 | Su ................... H02K 41/0356 396/72 |
| 2015/0201115 A1 | 7/2015 | Hsu et al. |
| 2015/0264240 A1 | 9/2015 | Chan |
| 2016/0139426 A1 | 5/2016 | Park |
| 2019/0011663 A1 | 1/2019 | Weng et al. |
| 2021/0132327 A1 * | 5/2021 | Sharma ................ H04N 23/55 |
| 2021/0389645 A1 * | 12/2021 | Kim .................... G03B 5/06 |
| 2022/0263981 A1 * | 8/2022 | Park .................... H04N 23/51 |
| 2022/0276462 A1 * | 9/2022 | Jang .................... G02B 7/102 |

\* cited by examiner

IMAGING CAMERA DRIVING MODULE AND ELECTRONIC DEVICE

RELATED APPLICATIONS

This application is a continuation patent application of U.S. application Ser. No. 16/931,331, filed on Jul. 16, 2020, which claims priority to Taiwan Application 109117093, filed on May 22, 2020, which is incorporated by reference herein in its entirety.

BACKGROUND

Technical Field

The present disclosure relates to an imaging camera driving module and an electronic device, more particularly to an imaging camera driving module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In general, a lens unit can be driven to move by a lens driving device to automatically focus on objects. However, when the lens unit tilts, there would be a focus shift between an optimal imaging position of an imaging lens assembly of the lens unit and an image surface where an image sensor located, resulting in poor peripheral image quality. For example, please refer to FIG. 1, which shows a schematic view of a conventional lens unit LS having a focus shift between an optimal imaging position BP thereof and an image surface IM when the lens unit LS is inclined relative to the image surface IM. As shown in the modulation transfer function (MTF) distribution diagram of FIG. 1, the lens unit LS tilts such that the flange back positions of the meridional marginal rays MR are different from that of the chief ray CR. As a result, a particular region of the image (e.g., region near the center of the image) would be clear and legible with high resolution, but regions of the image far away from the particular region (e.g., peripheral region of the image) would be blurry due to poor resolution. For instance, when an object having a noticeable contour between black and white at its periphery is imaged by a lens unit with focus shift, the noticeable contour would be a gradient gray boundary in a generated image of the lens unit, causing the contour difficult to determine and thus generating a blurry image.

Conventionally, in order to solve the problem that the periphery of images becomes blurry due to the lens unit tilting, an image contrast examination is performed, and a tilt of the lens unit can be obtained according to the results of the examination followed by aberration compensations and corrections. As such, the periphery of images is clear and legible. For example, please refer to FIG. 2 to FIG. 4, which show schematic views of a determination process of a conventional image contrast examination. As shown in FIG. 2, several image fractions F1-F12 are sampled from the center to the periphery of an original image, and FIG. 3 only shows those fractions F1-F12. Then, detect the contrast of each of the fractions F1-F12 and categorize them into determinable samples and indeterminable samples as shown in FIG. 4. Lastly, analyze those indeterminable samples (e.g., the fractions F9-F12 in FIG. 4) and thus determine causes of blurry peripheral image, such as lens unit tilting or assembly error, according to the analysis results.

However, the method of indirectly obtaining a tilt of a lens unit by analyzing generated images may have larger errors and thus may result in misjudgment. Accordingly, how to improve the configuration of the lens unit so as to accurately obtain a tilt of the lens unit is an important topic in the field nowadays.

SUMMARY

According to one aspect of the present disclosure, an imaging camera driving module includes a lens unit, a driving mechanism, a sensing mechanism and an image surface. The lens unit includes an imaging lens assembly, and the imaging lens assembly has an optical axis. At least a part of the driving mechanism is coupled to the lens unit so as to drive the lens unit to move in a direction parallel to the optical axis. The sensing mechanism includes a plurality of sensing magnets and a plurality of sensing elements. The sensing magnets are fixed to the lens unit, and at least a part of the lens unit is located between the sensing magnets and the driving mechanism, and the sensing magnets are blocked by the lens unit from facing the driving mechanism. The sensing elements are disposed on an image side of the imaging lens assembly. Each of the sensing elements is disposed corresponding to one of the sensing magnets, and each of the sensing elements is configured to detect a relative position of the sensing magnet corresponding thereto. The image surface has a central axis. The image surface is disposed on the image side of the imaging lens assembly, and the optical axis of the imaging lens assembly passes through the image surface. The sensing mechanism is configured to detect a tilt of the optical axis of the imaging lens assembly with respect to the central axis of the image surface. When a minimum distance in parallel with the central axis from one of the sensing magnets to the sensing element corresponding thereto is Da, the following condition is satisfied:

$$0 \text{ mm} \leq Da \leq 0.93 \text{ mm}.$$

According to another aspect of the present disclosure, an electronic device includes the aforementioned imaging camera driving module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
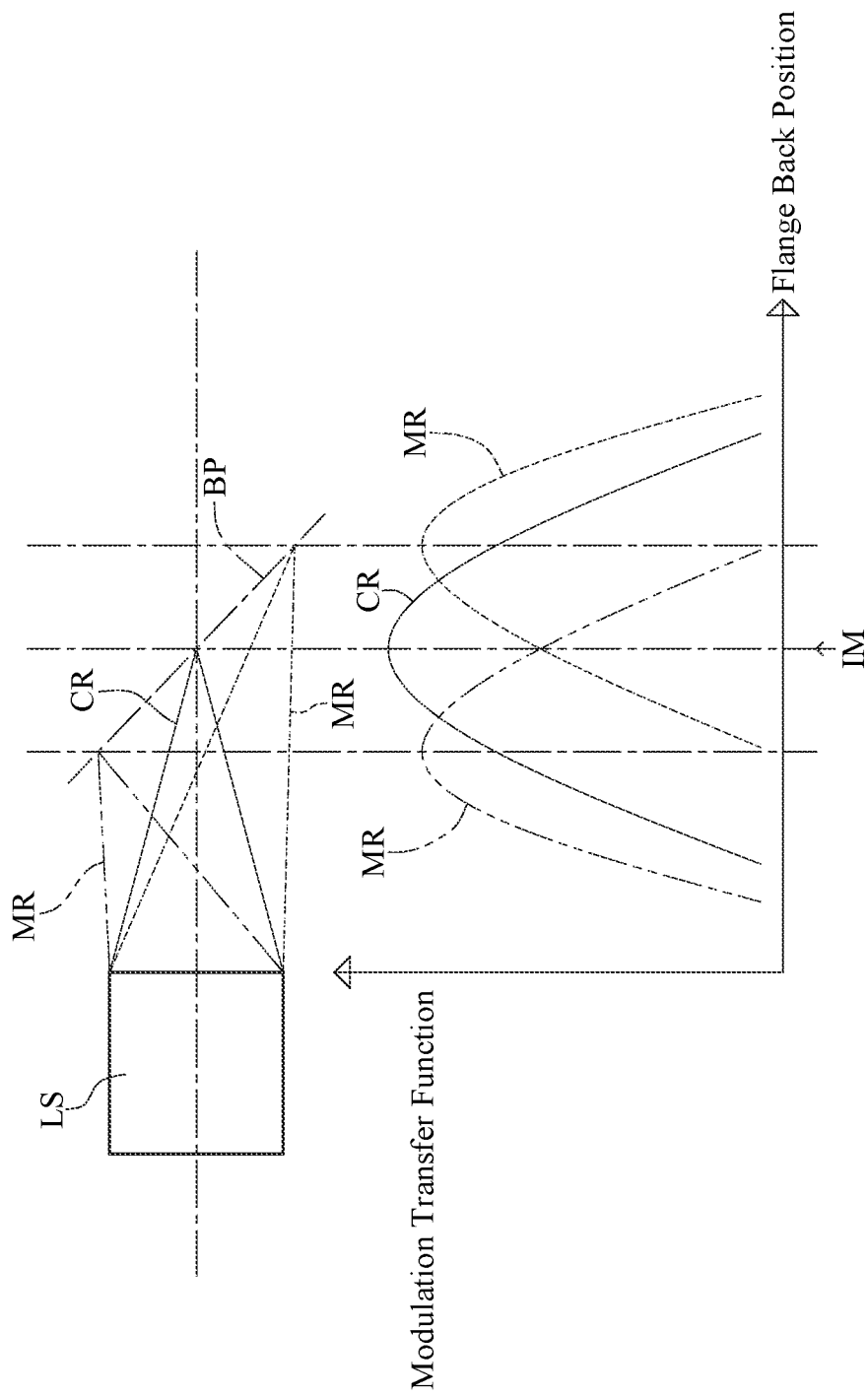
FIG. 1 is a schematic view of a conventional lens unit having a focus shift between an optimal imaging position thereof and an image surface when the lens unit is inclined relative to the image surface.
Figure 2:
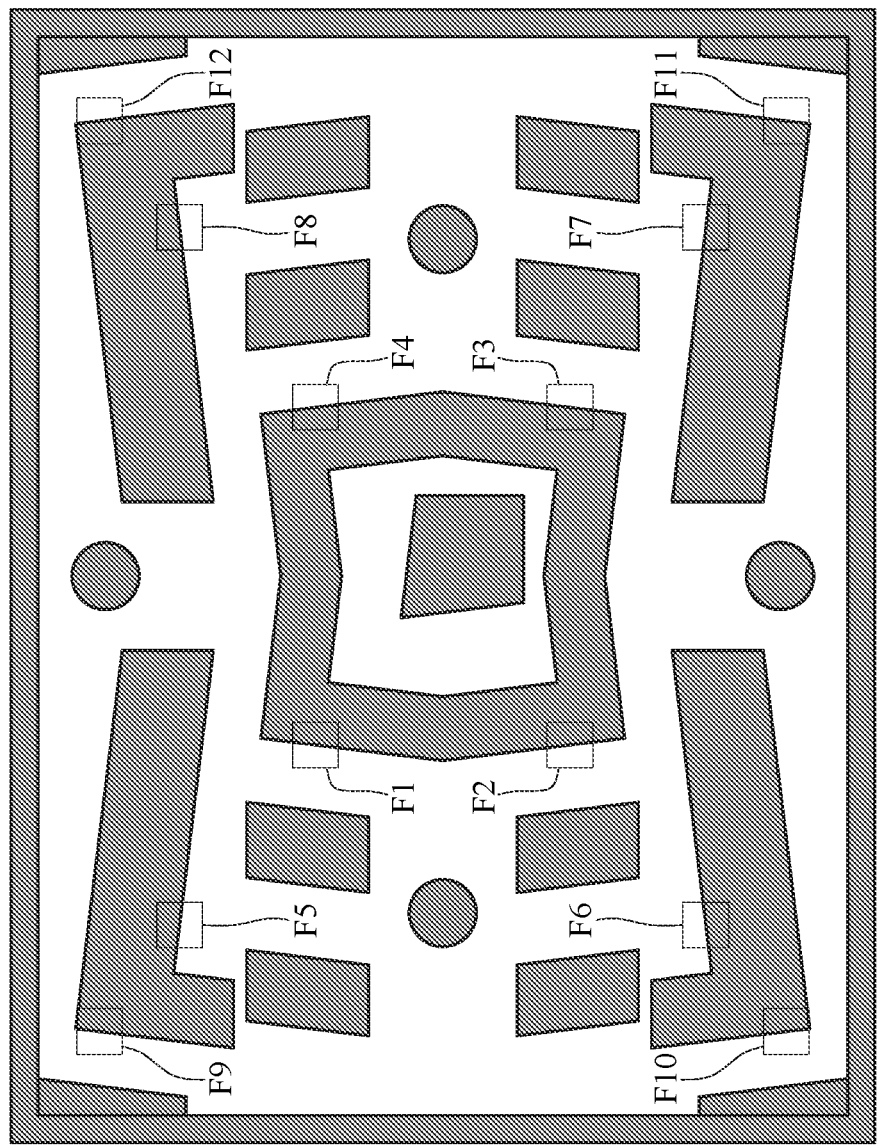
FIG. 2 to FIG. 4 are schematic views of a determination process of a conventional image contrast examination.
Figure 3:
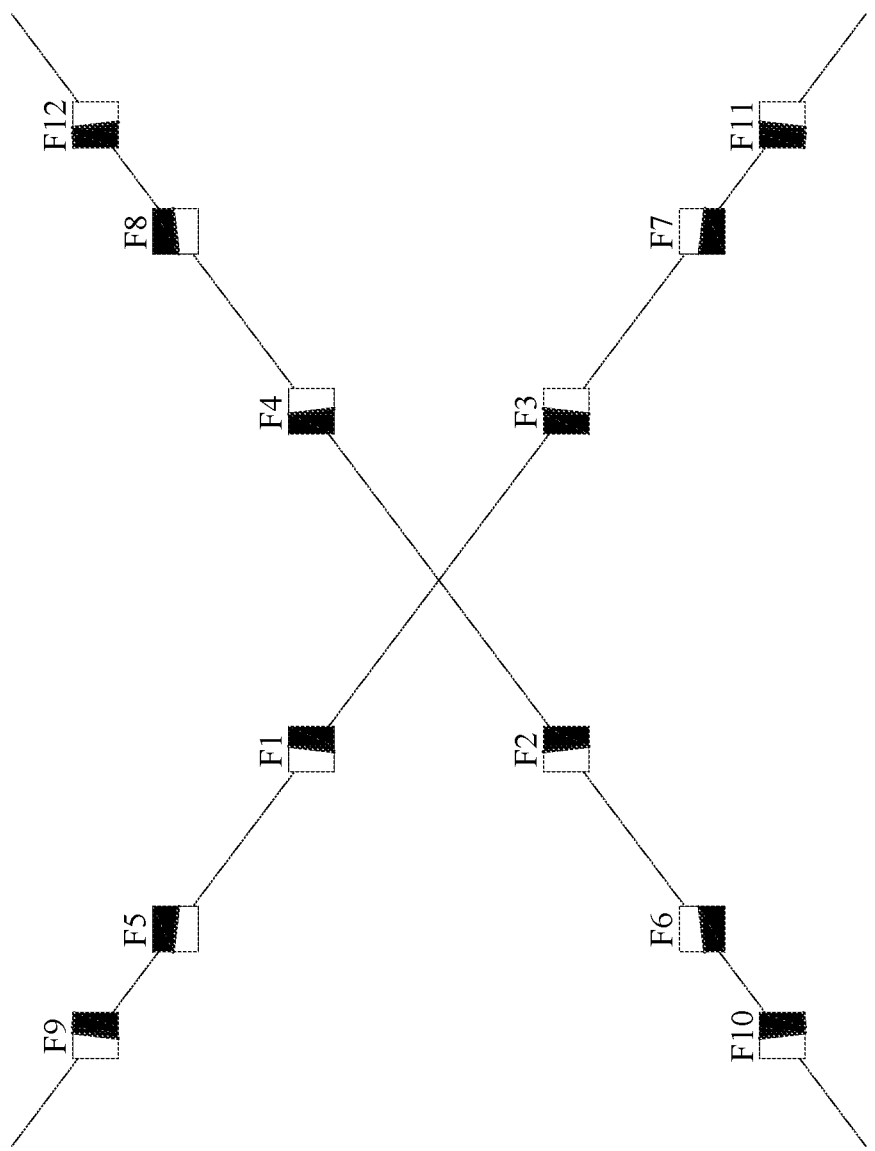
Figure 4:
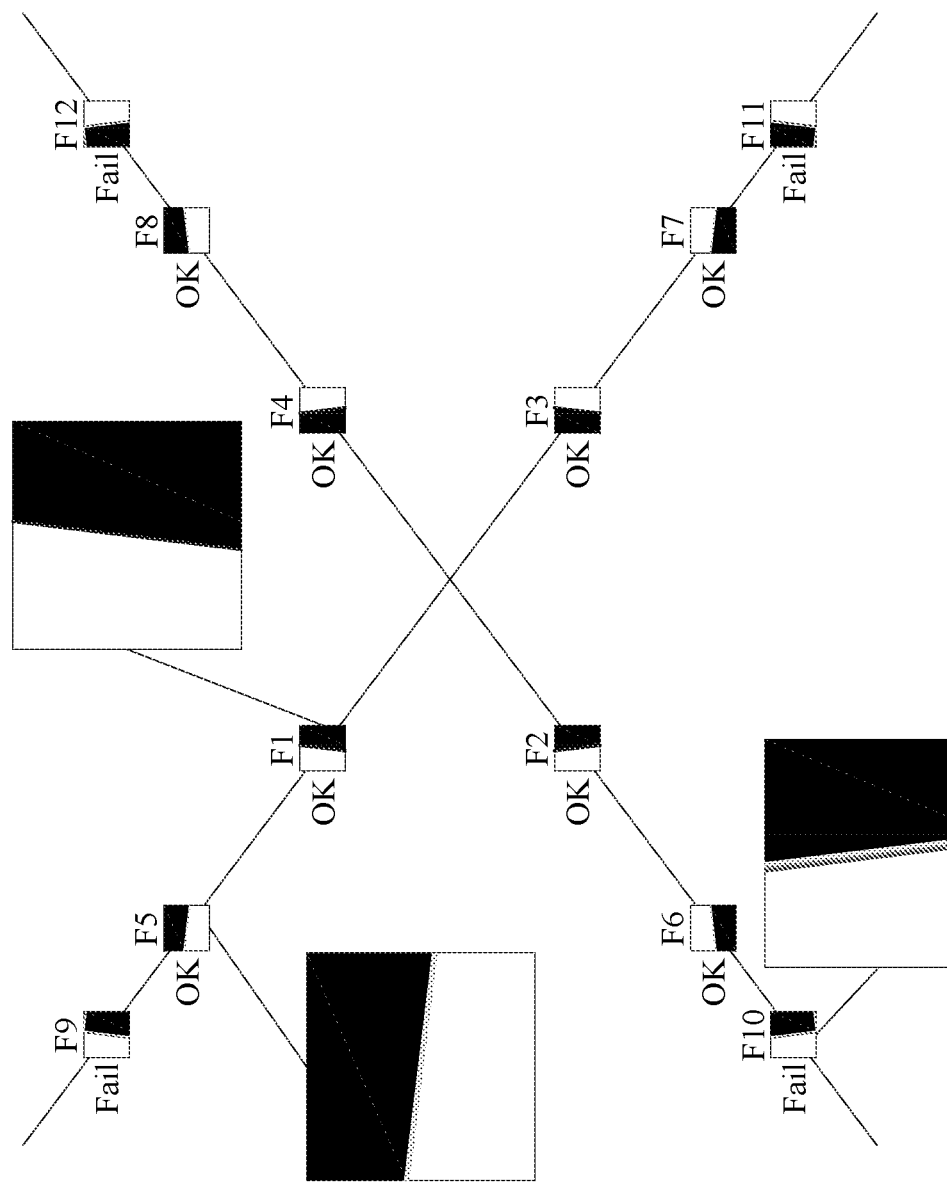

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging camera driving module, and the imaging camera driving module includes a lens unit, a driving mechanism, a sensing mechanism and an image surface. The lens unit includes an imaging lens assembly, and the imaging lens assembly has an optical axis. The image surface is disposed on an image side of the imaging lens assembly, and the image surface has a central axis. The optical axis of the imaging lens assembly passes through the image surface. At least a part of the driving mechanism is coupled to the lens unit, and the driving mechanism is configured to drive the lens unit to move in a direction parallel to the optical axis.

The sensing mechanism includes a plurality of sensing magnets and a plurality of sensing elements. The sensing magnets are fixed to the lens unit. Therefore, it is favorable for reducing the distance between the sensing magnets and the imaging lens assembly so as to reduce the sensing error of the sensing magnets and improve the space utilization of the imaging camera driving module. Moreover, at least a part of the lens unit is located between the sensing magnets and the driving mechanism, and the sensing magnets are blocked by the at least a part of the lens unit from facing the driving mechanism. Therefore, it is favorable for preventing the magnetic fields of the sensing mechanism and the driving mechanism from interfering with each other. Moreover, the number of the sensing magnets can be two to four, but the present disclosure is not limited thereto. In some configurations, the number of the sensing magnets can be five or more.

The sensing elements are disposed on the image side of the imaging lens assembly. The sensing elements are respectively disposed corresponding to the sensing magnets, and each of the sensing elements is configured to detect a relative position of the sensing magnet corresponding thereto. Moreover, there is an air gap between the sensing magnet and the sensing element corresponding thereto.

The sensing mechanism is configured to detect a tilt of the optical axis of the imaging lens assembly with respect to the central axis of the image surface so as to obtain a tilt of the lens unit. Therefore, it is favorable for analyzing the blurry areas of an image and then improving image quality by changing the capturing area of the image sensor and optimizing the image with additional processes. Moreover, the tilt of the lens unit can be, for example, a tilt of a connection line of at least two sensing magnets located on opposite sides of the lens unit with respect to the central axis, wherein the connection line intersects the optical axis. The configuration of the sensing mechanism as provided in the embodiments of the present disclosure for sensing the tilt of the lens unit can also be applied to imaging camera driving modules using suspension wires.

When a minimum distance in parallel with the central axis from one of the sensing magnets to the sensing element corresponding thereto is Da, the following condition is satisfied: $0 \text{ mm} \le Da \le 0.93 \text{ mm}$. Therefore, it is favorable for further restricting the minimum distance between the sensing magnet and the sensing element within in an optimal working range of the sensing element. Moreover, the following condition can also be satisfied: $0 \text{ mm} \le Da \le 0.5 \text{ mm}$. Please refer to FIG. 13, which shows a schematic view of Da according to the 1st embodiment of the present disclosure.

The imaging lens assembly can include a plurality of optical lens elements, and the plurality of optical lens elements include a maximum-diameter lens element. An outer diameter of the maximum-diameter lens element is larger than outer diameters of the other optical lens elements. When the outer diameter of the maximum-diameter lens element is ϕD, the following condition can be satisfied: 6 mm<ϕD<20 mm. Therefore, the outer diameter range can correspond to the imaging lens assembly of high resolution, and it is favorable for improving image quality. Please refer to FIG. 11, which shows a schematic view of ϕD according to the 1st embodiment of the present disclosure.

In some configurations, the number of the sensing magnets is two. When the outer diameter of the maximum-diameter lens element is ϕD, and a minimum distance between the two sensing magnets is d, the following condition can be satisfied: ϕD<d. Therefore, it is favorable for the sensing mechanism to be properly arranged for better sensing efficiency. The minimum distance between the two sensing magnets refers to a linear distance between the two sensing magnets in a direction perpendicular to and intersecting the optical axis. Moreover, the following condition can also be satisfied: 0.05 mm<(d−ϕD)/2<1.0 mm. Therefore, it is favorable for preventing assembly deformation caused by overly thin walls at the edges of the lens unit so as to improve the assembling yield rate. Moreover, the following condition can also be satisfied: 0.05 mm≤(d−ϕD)/2≤0.8 mm. Therefore, the thickness of walls at the edges of the lens unit designed within the predetermined range is favorable for improving space utilization in the imaging camera driving module while ensuring the assembling yield rate. Please refer to FIG. 11, which shows a schematic view of ϕD and d according to the 1st embodiment of the present disclosure.

The sensing magnets can respectively overlap the sensing elements in a direction parallel to the optical axis. Therefore, the sensing elements are spatially configured for effective detection so as to ensure the sensing performance of the sensing mechanism. Please refer to FIG. 9, which shows the sensing magnets 171 respectively overlapping the sensing elements 173 in a direction parallel to the optical axis OL according to the 1st embodiment of the present disclosure.

The driving mechanism can include at least one driving magnet and at least one coil disposed corresponding to each other. One of the driving magnet and the coil is coupled to the lens unit. The driving mechanism drives the lens unit to move in the direction parallel to the optical axis by a driving force generated by an electromagnetic interaction between the driving magnet and the coil. Therefore, it is favorable for obtaining a proper space arrangement of the driving mechanism so as to optimize the driving efficiency of the electromagnetic force. Said driving force is the Lorentz force generated by an electromagnetic interaction between the driving magnet and the coil.

In some configurations, the sensing magnets and the at least one coil can be alternatively disposed in a circumferential direction about the optical axis. Therefore, the sensing mechanism and the driving mechanism can be properly arranged in the imaging camera driving module so as to be applicable to various structural designs, thus reducing design and manufacturing costs. Please refer to FIG. 8, which shows the sensing magnets 171 and the coils 163 being alternatively disposed in a circumferential direction about the optical axis OL according to the 1st embodiment of the present disclosure.

In some configurations, the sensing magnets can overlap the coil in a direction parallel to the optical axis. Therefore, the coil can be wound on the lens unit in many manners, which is favorable for increasing design flexibility of assembly stations, thus increasing manufacturing yield rate. It is noted that the foregoing is only intended to describe the spatial arrangement of the sensing magnets and the coil, and it does not conflict with the features of "the sensing magnets being blocked by a part of the lens unit from facing the driving mechanism" as described above. Please refer to FIG. 20, which shows the sensing magnets 371 respectively overlapping the coil 363 in a direction parallel to the optical axis OL according to the 2nd embodiment of the present disclosure.

When a height in parallel with the central axis of each of the sensing elements is h, the following condition can be satisfied: 0.01 mm<h<0.9 mm. Therefore, it is favorable for increasing the feasibility of miniaturizing the imaging camera driving module. Please refer to FIG. 11, which shows a schematic view of h according to the 1st embodiment of the present disclosure.

When the minimum distance in parallel with the central axis from each of the sensing magnets to the sensing element corresponding thereto is Da, and the height in parallel with the central axis of each of the sensing elements is h, the following condition can be satisfied: 0.01<Da/h≤4.0. Therefore, it is favorable for defining the tilt range of the lens unit that can be detected by the sensing elements so as to ensure sensing efficiency of the sensing mechanism.

A shape of one side of the lens unit facing toward the image side can be polygonal. Therefore, it is favorable for the lens unit to collaborate with driving mechanisms of more complex structure and reducing time costs of assembling automatic machines. Said polygonal can be quadrilateral, hexagonal, octagonal or decagonal, and the present disclosure is not limited thereto.

The side of the lens unit facing toward the image side can be polygon-shaped with chamfered corners. Therefore, it is favorable for maintaining product quality of high precision and increasing product design flexibility.

The lens unit can have at least two gate traces, and the gate traces are located at the chamfered corners. Therefore, it is favorable for ensuring that the cutting surfaces of the gate traces do not interfere with other mechanisms. The number of the gate traces can be at least three, and the present disclosure is not limited thereto. In some configurations, the number of the gate traces can be at least four.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 5:
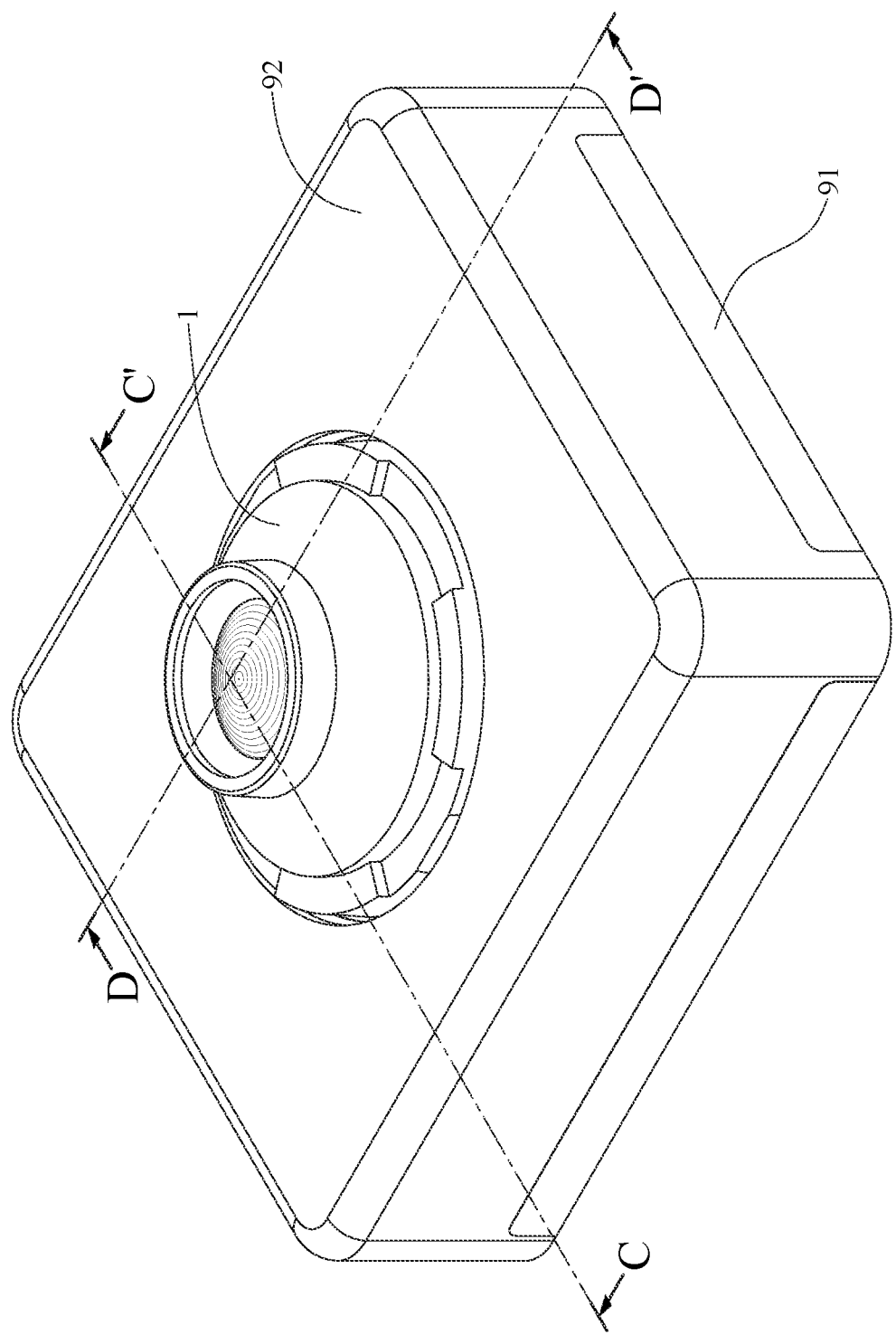
FIG. 5 is a perspective view of an image capturing unit according to the 1st embodiment of the present disclosure.
Figure 6:
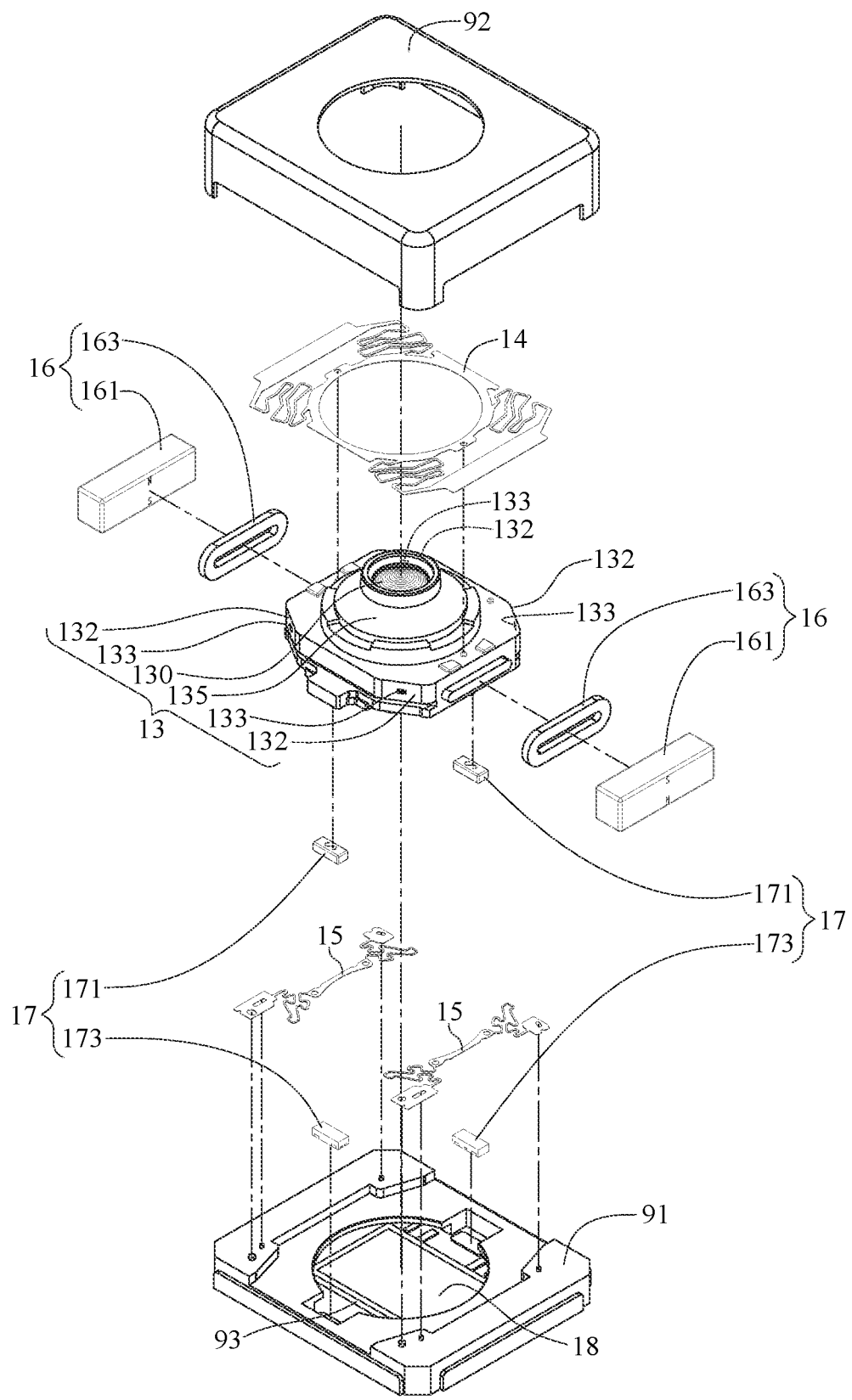
FIG. 6 is an exploded view of the image capturing unit in FIG. 5.
Figure 7:
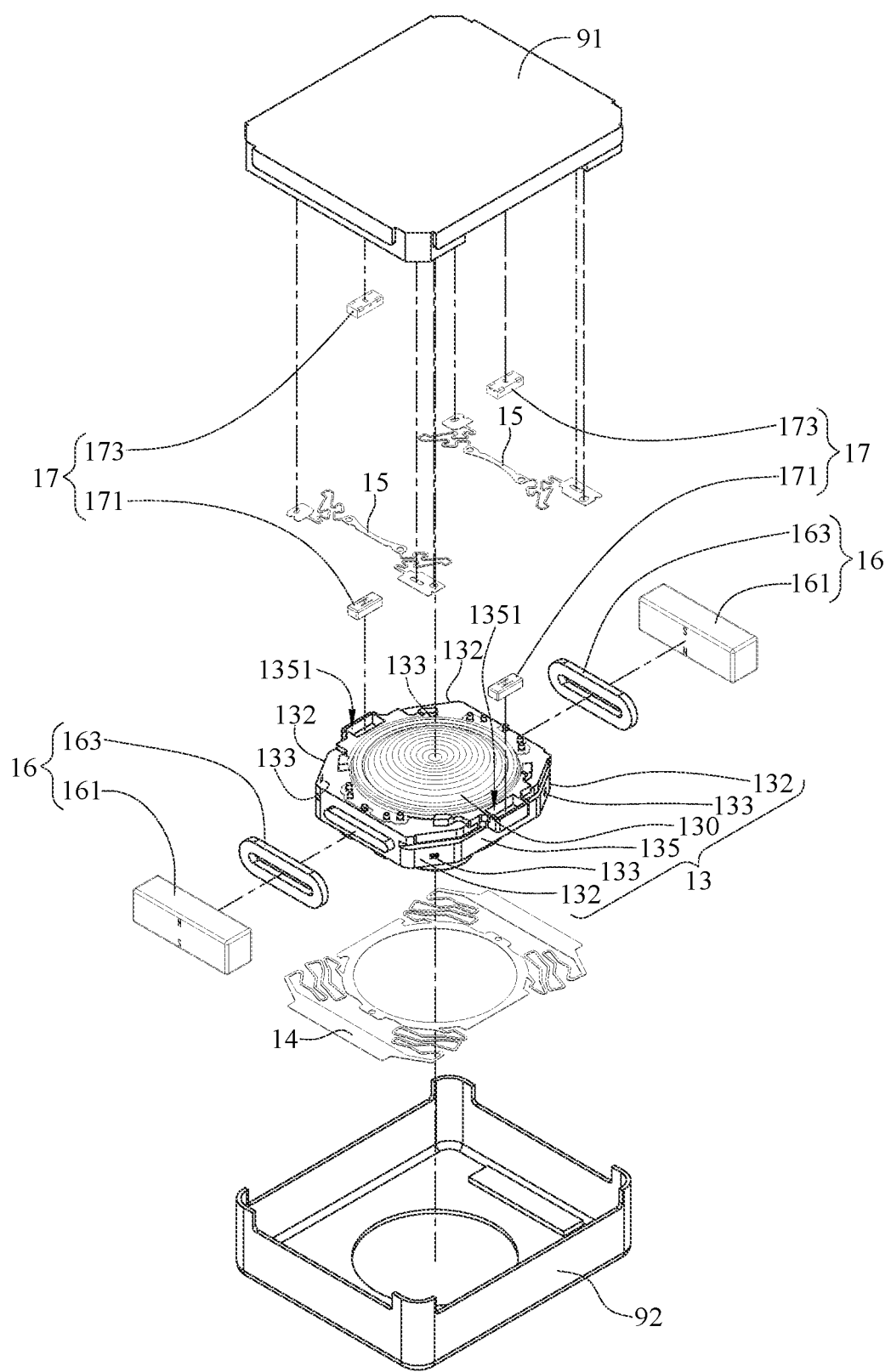
FIG. 7 is another exploded view of the image capturing unit in FIG. 5.
Figure 8:
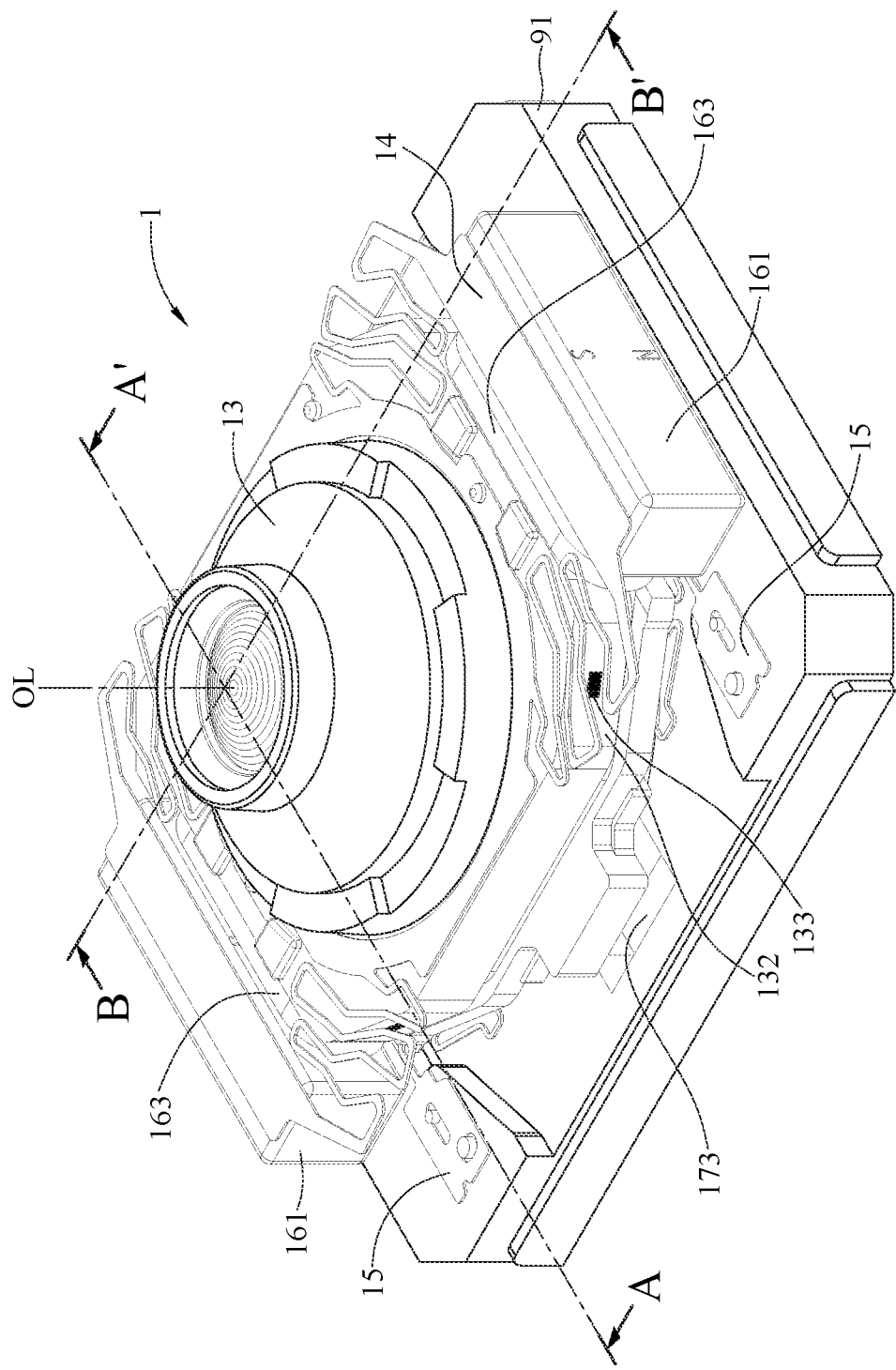
FIG. 8 is a perspective view of an imaging camera driving module, an image sensor and a base of the image capturing unit in FIG. 5.
Figure 9:
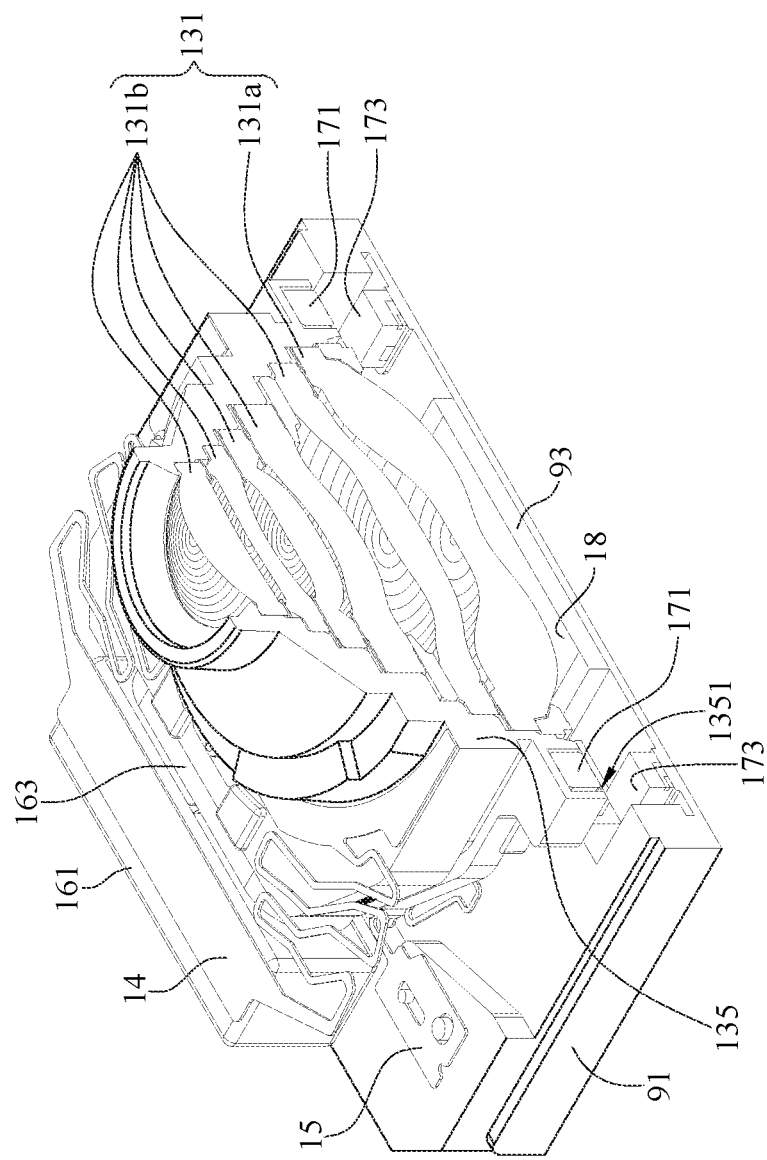
FIG. 9 is a perspective view of the sectioned imaging camera driving module, image sensor and base along line A-A' in FIG. 8.
Figure 10:
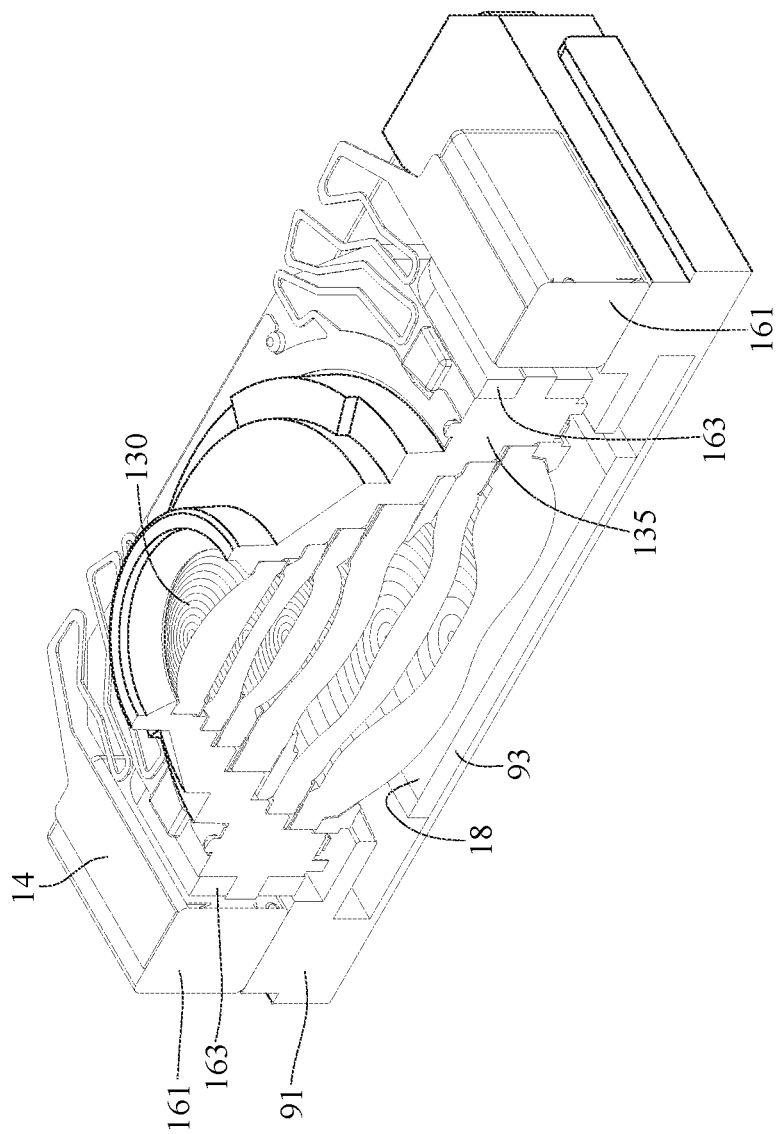
FIG. 10 is a perspective view of the sectioned imaging camera driving module, image sensor and base along line B-B' in FIG. 8.
Figure 11:
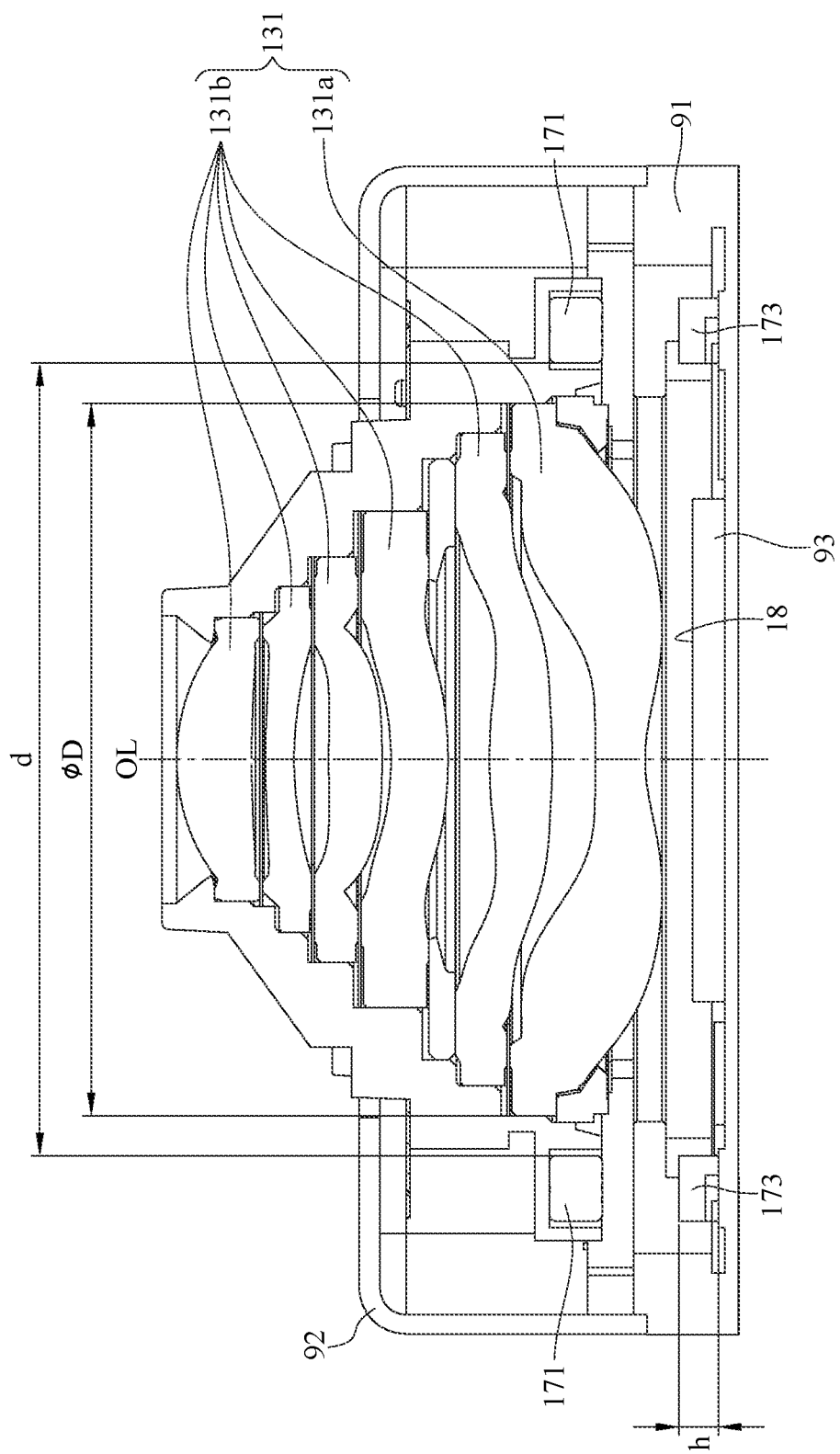
FIG. 11 is a cross-sectional view of the image capturing unit along line C-C' in FIG. 5.
Figure 12:
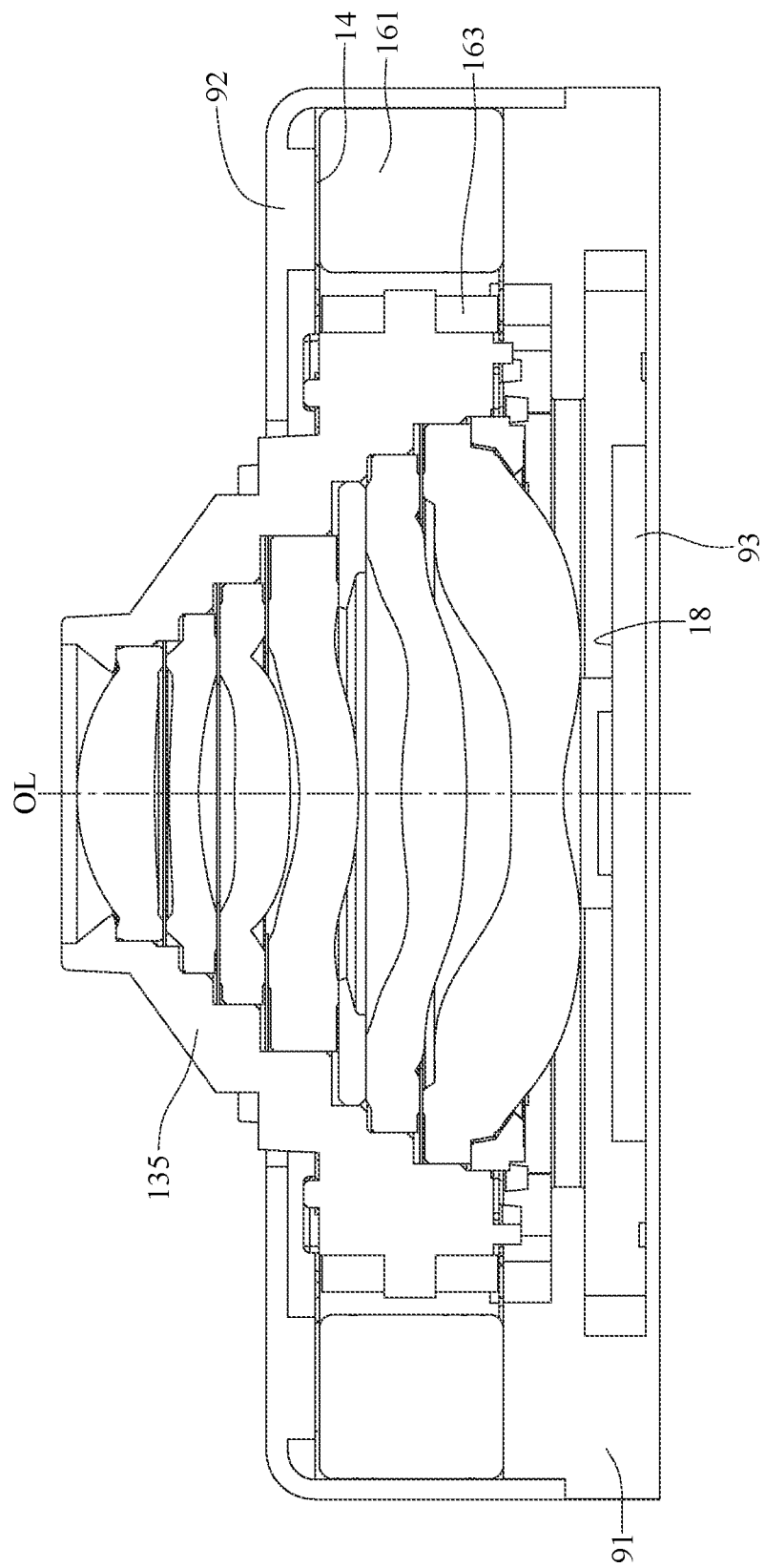
FIG. 12 is a cross-sectional view of the image capturing unit along line D-D' in FIG. 5.
Figure 13:
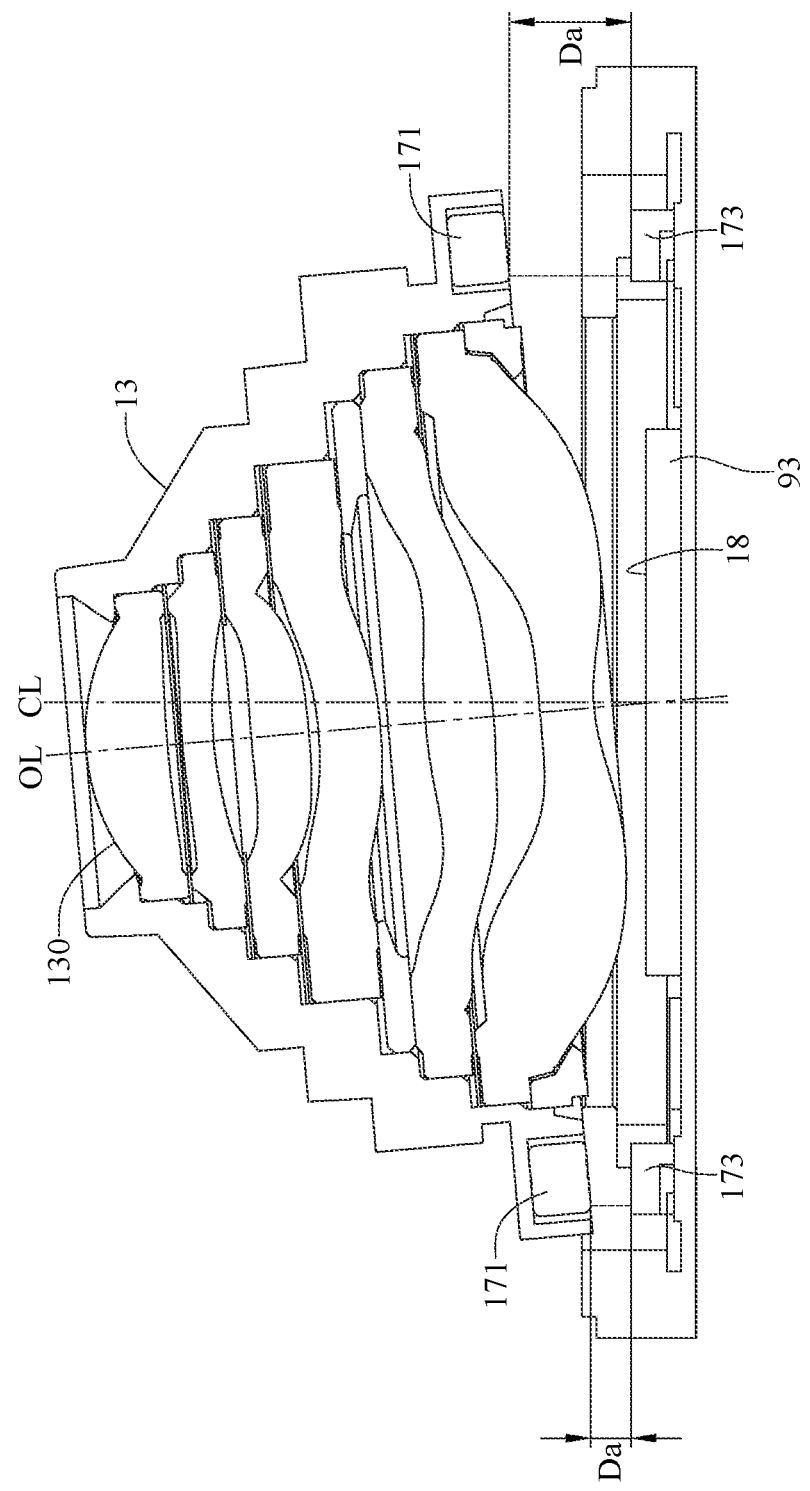
FIG. 13 is a cross-sectional view of the imaging camera driving module being inclined with respect to the image sensor and the base in FIG. 8.

Please refer to FIG. 5 to FIG. 13, where FIG. 5 is a perspective view of an image capturing unit according to the 1st embodiment of the present disclosure, FIG. 6 is an exploded view of the image capturing unit in FIG. 5, FIG. 7 is another exploded view of the image capturing unit in FIG. 5, FIG. 8 is a perspective view of an imaging camera driving module, an image sensor and a base of the image capturing unit in FIG. 5, FIG. 9 is a perspective view of the sectioned imaging camera driving module, image sensor and base along line A-A' in FIG. 8, FIG. 10 is a perspective view of the sectioned imaging camera driving module, image sensor and base along line B-B' in FIG. 8, FIG. 11 is a cross-sectional view of the image capturing unit along line C-C' in FIG. 5, FIG. 12 is a cross-sectional view of the image capturing unit along line D-D' in FIG. 5, and FIG. 13 is a cross-sectional view of the imaging camera driving module being inclined with respect to the image sensor and the base in FIG. 8.

In this embodiment, the image capturing unit includes an imaging camera driving module 1, a base 91, a casing 92 and an image sensor 93. The imaging camera driving module 1 includes a lens unit 13, an upper flat spring 14, two lower flat springs 15, a driving mechanism 16, a sensing mechanism 17 and an image surface 18.

The casing 92 is disposed on the base 91, and the lens unit 13 is movably disposed between the casing 92 and the base 91 via the upper flat spring 14 and the lower flat springs 15. Specifically, each of the upper flat spring 14 and the lower flat springs 15 includes an inner fixed part, an outer fixed part, and an elastic part connected to and located between the inner fixed part and the outer fixed part (their reference numerals are omitted). The inner fixed part of the upper flat spring 14 is fixed to the lens unit 13, and the outer fixed part of the upper flat spring 14 is fixed to the inside of the casing 92, so that the lens unit 13 is movable relative to the casing 92. Also, the inner fixed part of each lower flat spring 15 is fixed to the lens unit 13, and the outer fixed part of each lower flat spring 15 is fixed to the base 91, so that the lens unit 13 is movable relative to the base 91.

The lens unit 13 includes an imaging lens assembly 130 and a barrel 135 for holding the imaging lens assembly 130. The imaging lens assembly 130 has an optical axis OL, and the imaging lens assembly 130 includes a plurality of optical lens elements 131. The optical lens elements 131 include a maximum-diameter lens element 131a, and an outer diameter of the maximum-diameter lens element 131a is larger than outer diameters of the other optical lens elements 131b.

The image surface 18 is located on an image side of the imaging lens assembly 130, and the image surface 18 has a central axis CL in parallel with its normal line and passing through the geometric center thereof. The optical axis OL of the imaging lens assembly 130 passes through the image surface 18. The image sensor 93 is disposed on the base 91 and located on or near the image surface 18. In this embodiment, the maximum-diameter lens element 131a is closer to the image surface 18 than the other optical lens elements 131b to the image surface 18.

A shape of one side of the lens unit 13 facing toward the image side is octagonal, and the barrel 135 of the lens unit 13 is polygon-shaped with four chamfered corners 132. In addition, the lens unit 13 has four gate traces 133 respectively located at the four chamfered corners 132.

The driving mechanism 16 includes two driving magnets 161 and two coils 163. The driving magnets 161 are respectively fixed to two opposite sides of the base 91, the coils 163 are respectively coupled to two opposite sides of the barrel 135 of the lens unit 13, and the driving magnets 161 are respectively disposed corresponding to the coils 163. Therefore, a driving force can be generated by an electromagnetic interaction between the driving magnets 161 and the coils 163 to drive the lens unit 13 to move in a direction in parallel with the optical axis OL. In this embodiment, the two groups of corresponding driving magnet 161 and coil 163 of the driving mechanism 16 are respectively disposed on two opposite sides of the lens unit 13 to together generate a resultant force in the direction in parallel with the optical axis OL applied on the lens unit 13 so as to drive the lens unit 13 to move in the direction in parallel with the optical axis OL.

The sensing mechanism 17 includes two sensing magnets 171 and two sensing elements 173. The sensing magnets 171 are fixed to the barrel 135 of the lens unit 13, and the sensing magnets 171 and the coils 163 are alternatively disposed in a circumferential direction about the optical axis OL. The sensing elements 173 are disposed on the image side of the imaging lens assembly 130 and fixed to the base 91. The sensing elements 173 are respectively disposed corresponding to the sensing magnets 171, and there is an air gap formed between the sensing magnet 171 and the corresponding sensing element 173. Each of the sensing elements 173 is configured to detect a relative position of the sensing magnet 171 corresponding thereto.

As shown in FIG. 13, when the optical axis OL of the imaging lens assembly 130 is at an angle relative to the central axis CL of the image surface 18, the imaging camera driving module 1 can detect a tilt of the optical axis OL with respect to the central axis CL by the sensing mechanism 17 and thereby obtain a tilt of the lens unit 13. Moreover, the tilt of the lens unit 13 can be obtained by detecting a tilt of a connection line of the two sensing magnets 171 intersecting the optical axis OL with respect to the central axis CL.

In this embodiment, as shown in FIG. 12, the outer fixed part of the upper flat spring 14 is clamped and fixed between the casing 92 and the driving magnets 161.

In this embodiment, as seen in FIG. 8 and FIG. 9, the sensing magnets 171 are disposed in accommodation grooves 1351 of the barrel 135, at least a part of the barrel 135 is located between the sensing magnets 171 and the driving mechanism 16, and the sensing magnets 171 are blocked by the barrel 135 from facing the driving mechanism 16.

In this embodiment, the sensing magnets 171 respectively overlap the sensing elements 173 in a direction parallel to the optical axis OL.

A minimum distance in parallel with the central axis CL from one of the sensing magnets 171 to the sensing element 173 corresponding thereto is Da. In this embodiment, as shown in FIG. 13, when the optical axis OL of the imaging lens assembly 130 is at an angle relative to the central axis CL of the image surface 18, the following conditions are satisfied at two opposite sides of the image capturing unit, respectively: Da=0.28 mm; and Da=0.86 mm.

When the outer diameter of the maximum-diameter lens element 131a is ϕD, the following condition is satisfied: ϕD=5.45 mm.

When a minimum distance between the two sensing magnets 171 is d, the following condition is satisfied: d=6.07 mm.

When the outer diameter of the maximum-diameter lens element 131a is ϕD, and the minimum distance between the two sensing magnets 171 is d, the following conditions are satisfied: ϕD<d; and (d−ϕD)/2=0.31 mm.

When a height in parallel with the central axis CL of each of the sensing elements 173 is h, the following condition is satisfied: h=0.3 mm.

The minimum distance in parallel with the central axis CL from one of the sensing magnets 171 to the sensing element 173 corresponding thereto is Da, and the height in parallel with the central axis CL of each of the sensing elements 173 is h. In this embodiment, as shown in FIG. 13, when the optical axis OL of the imaging lens assembly 130 is at an angle relative to the central axis CL of the image surface 18, the following conditions are satisfied at two opposite sides of the image capturing unit, respectively: Da/h=0.93; and Da/h=2.87.

2nd Embodiment

Figure 14:
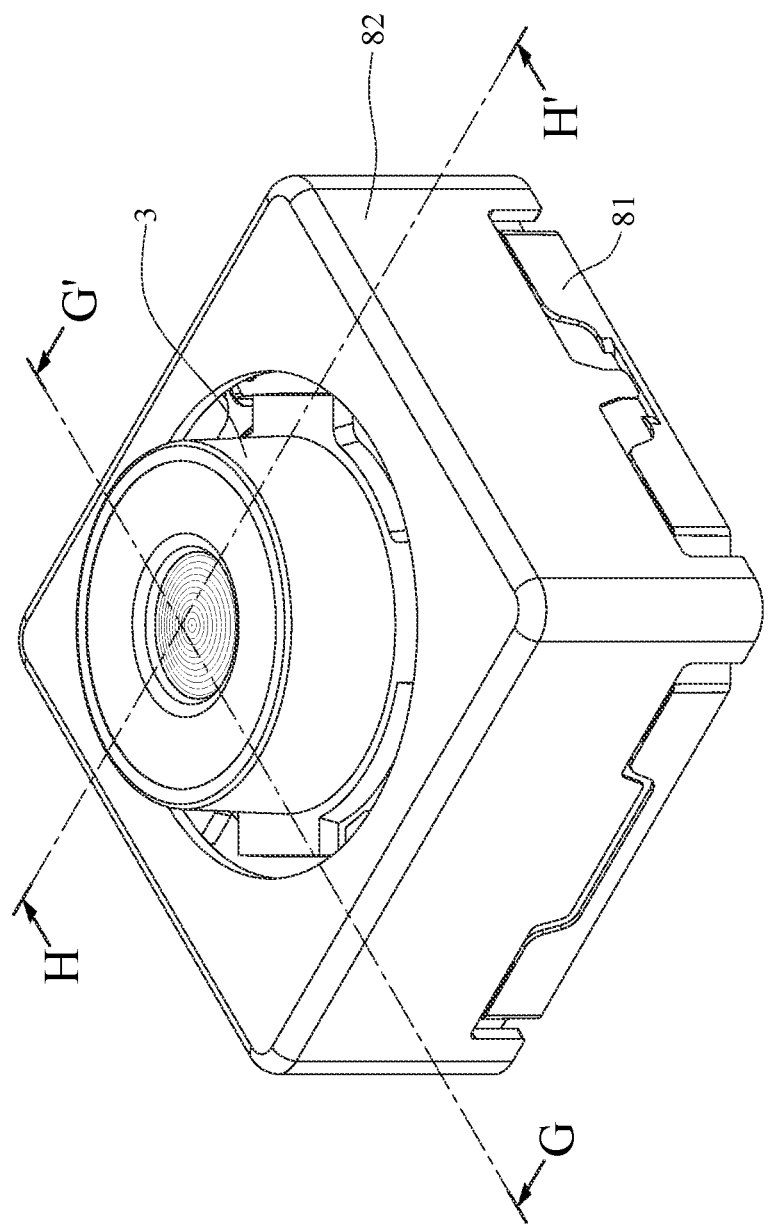
FIG. 14 is a perspective view of an image capturing unit according to the 2nd embodiment of the present disclosure.
Figure 15:
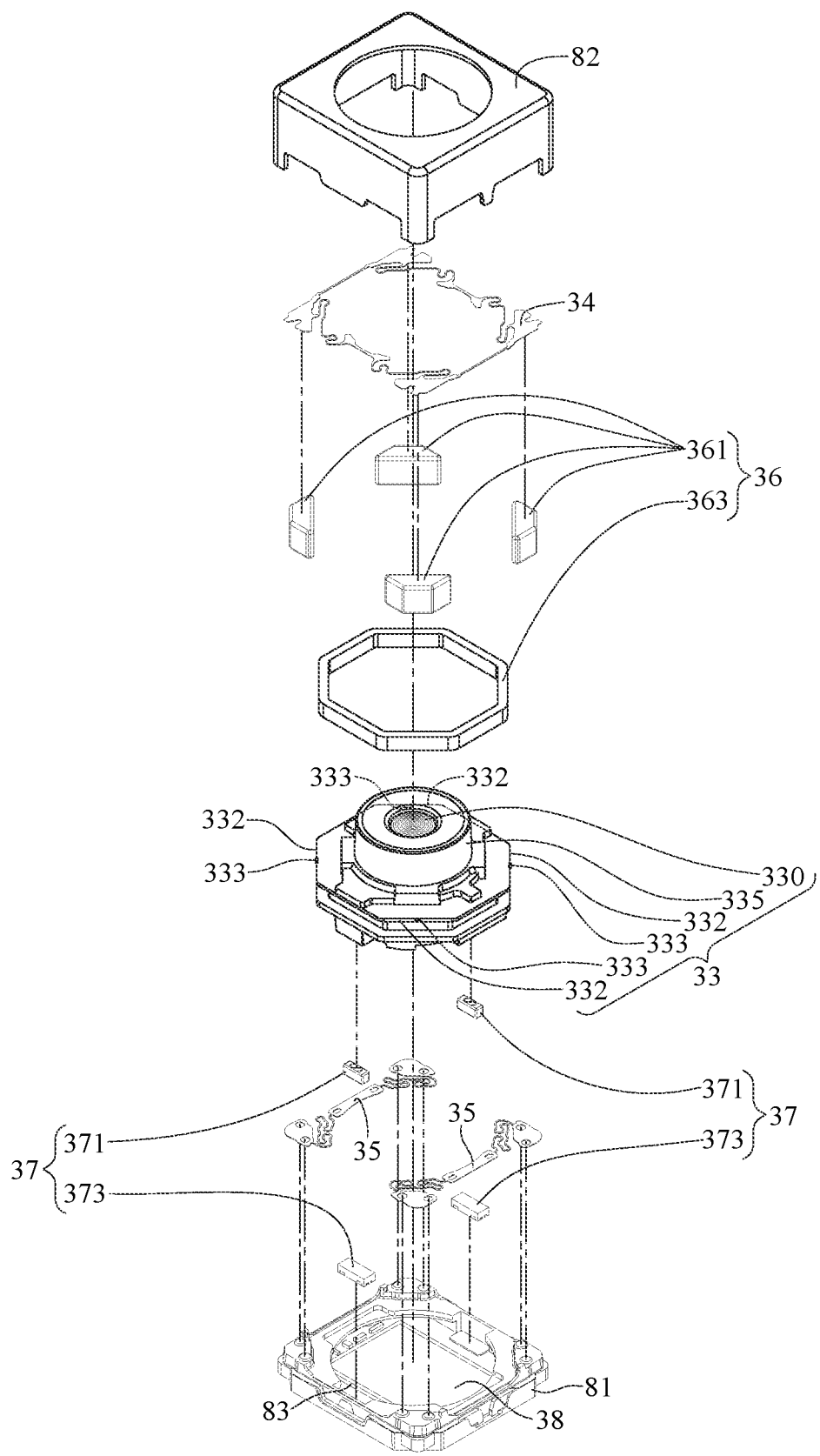
FIG. 15 is an exploded view of the image capturing unit in FIG. 14.
Figure 16:
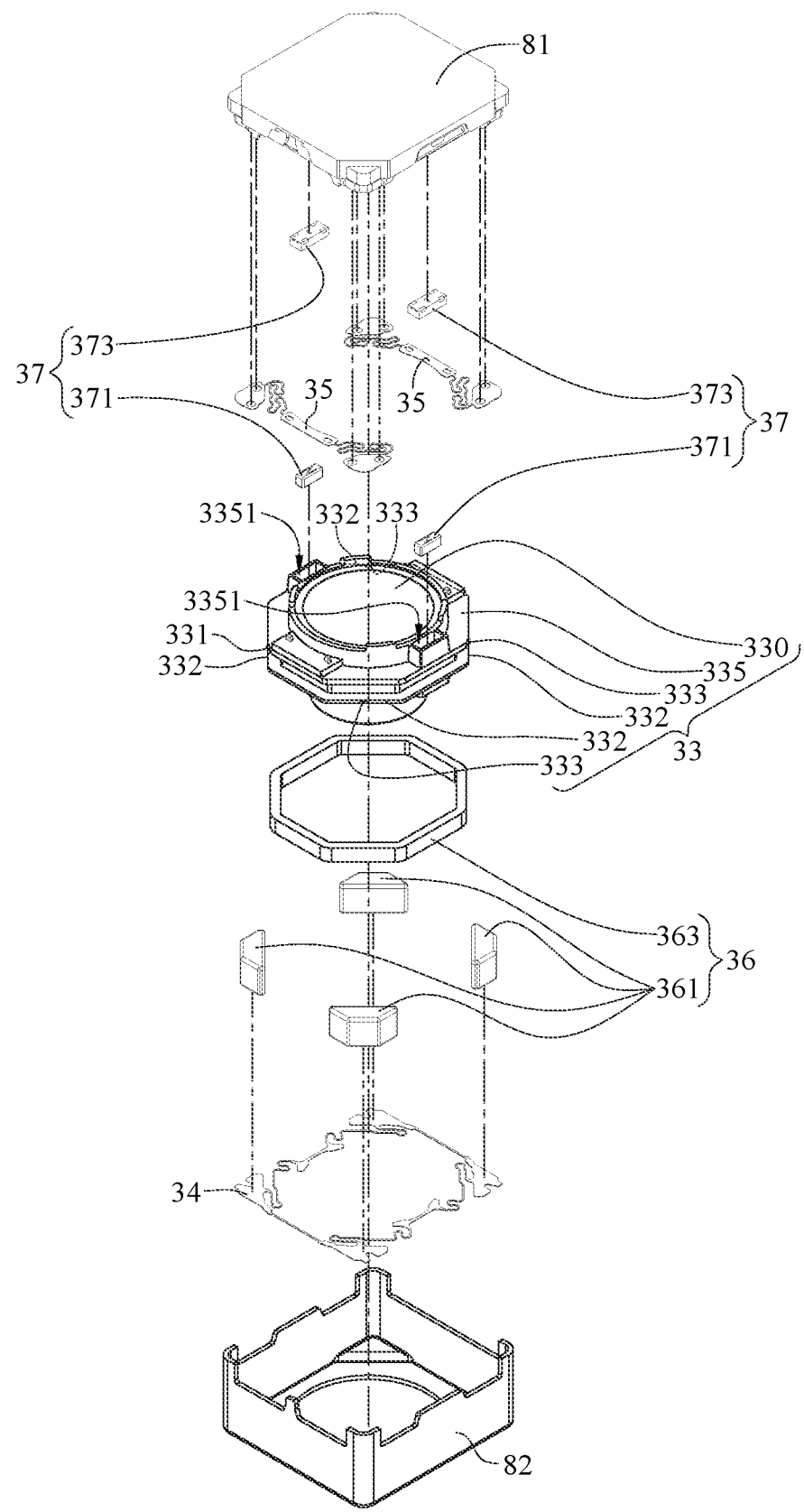
FIG. 16 is another exploded view of the image capturing unit in FIG. 14.

Please refer to FIG. 14 to FIG. 22, where FIG. 14 is a perspective view of an image capturing unit according to the 2nd embodiment of the present disclosure, FIG. 15 is an exploded view of the image capturing unit in FIG. 14, FIG.

Figure 17:
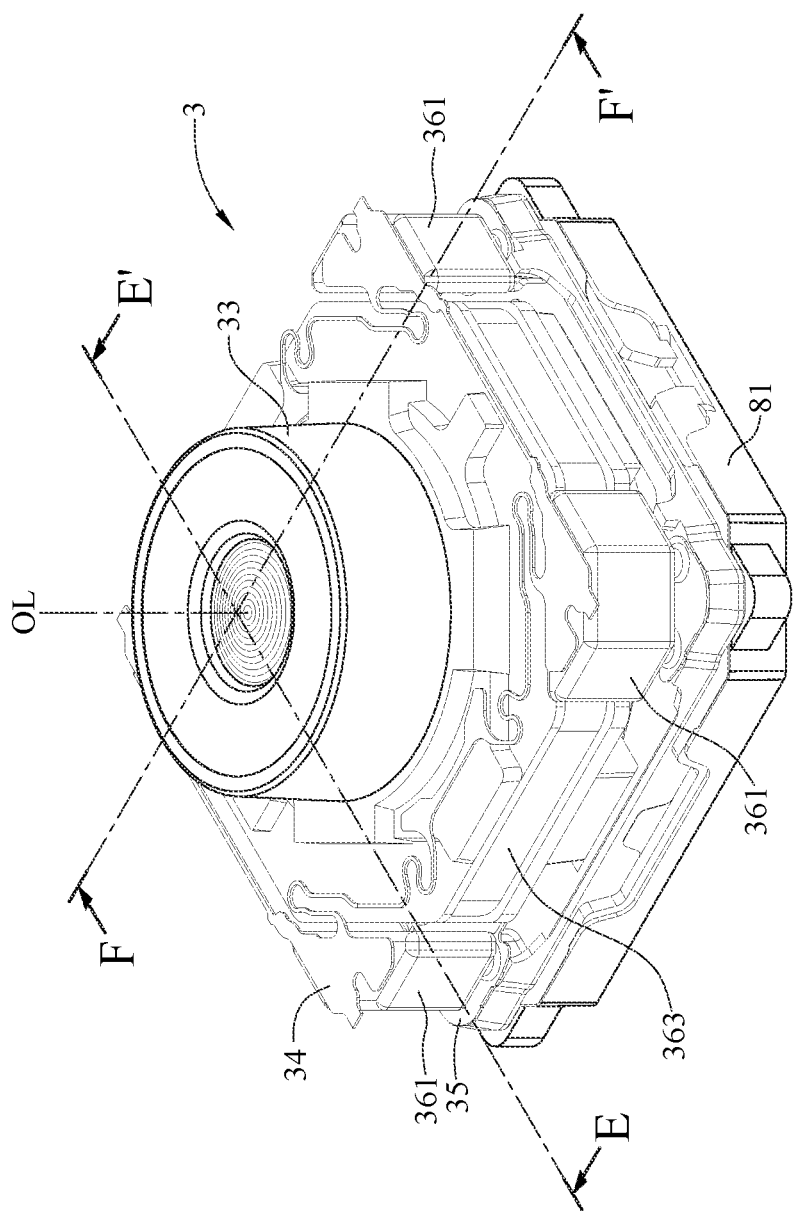
FIG. 17 is a perspective view of an imaging camera driving module, an image sensor and a base of the image capturing unit in FIG. 14.
Figure 18:
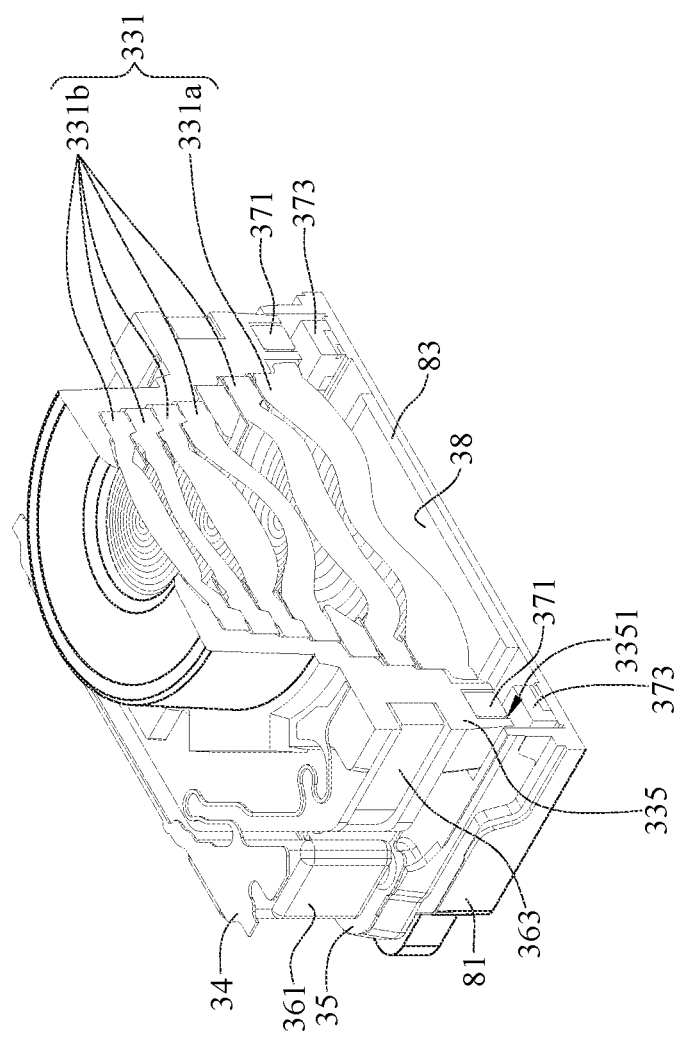
FIG. 18 is a perspective view of the sectioned imaging camera driving module, image sensor and base along line E-E' in FIG. 17.
Figure 19:
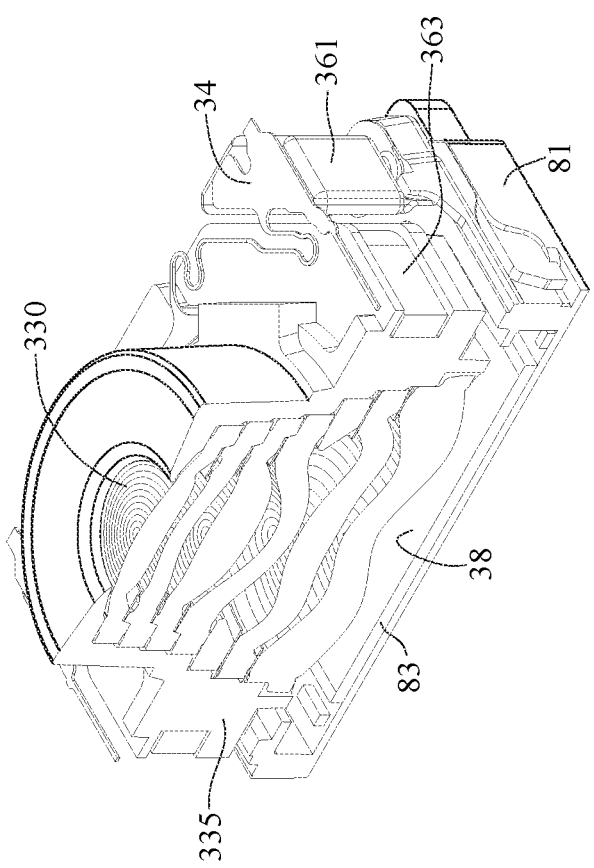
FIG. 19 is a perspective view of the sectioned imaging camera driving module, image sensor and base along line F-F' in FIG. 17.
Figure 20:
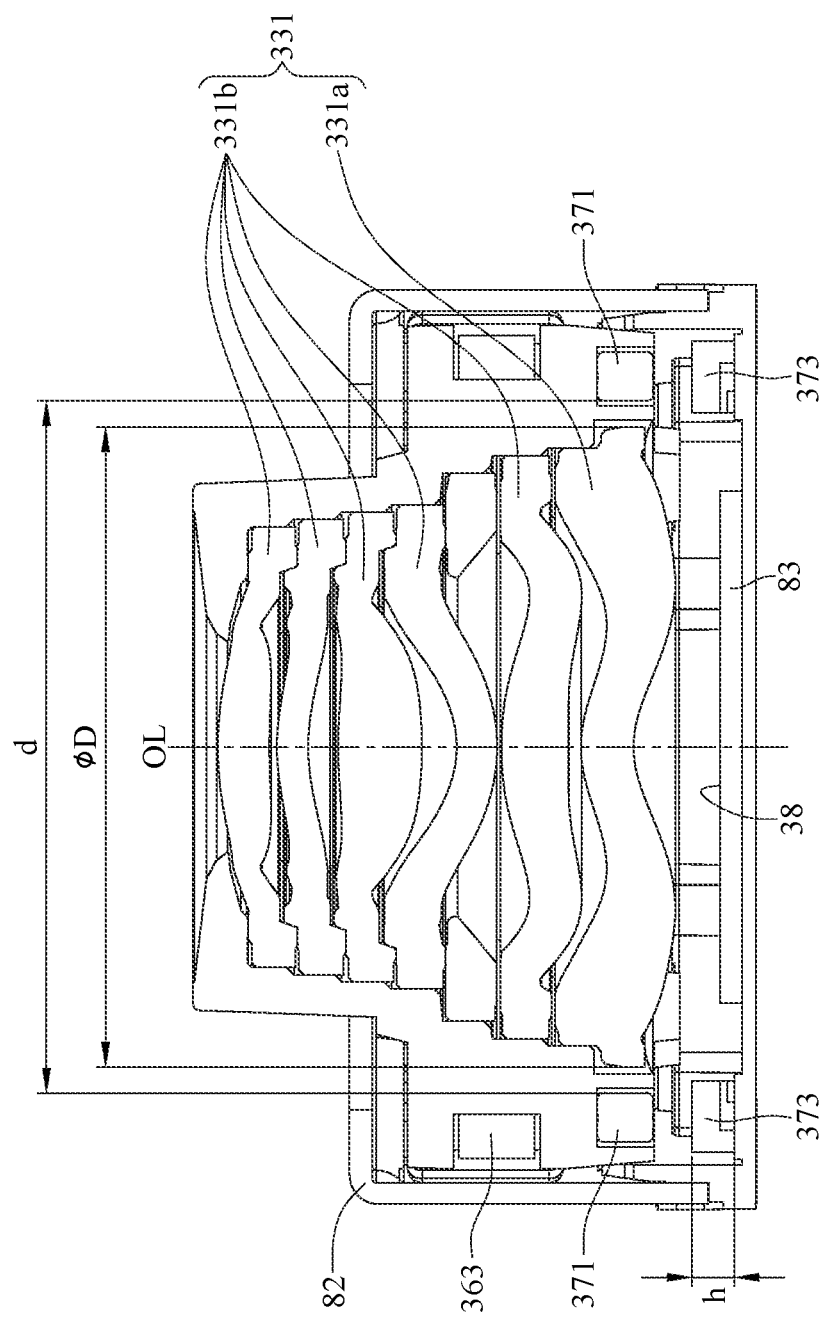
FIG. 20 is a cross-sectional view of the image capturing unit along line G-G' in FIG. 14.
Figure 21:
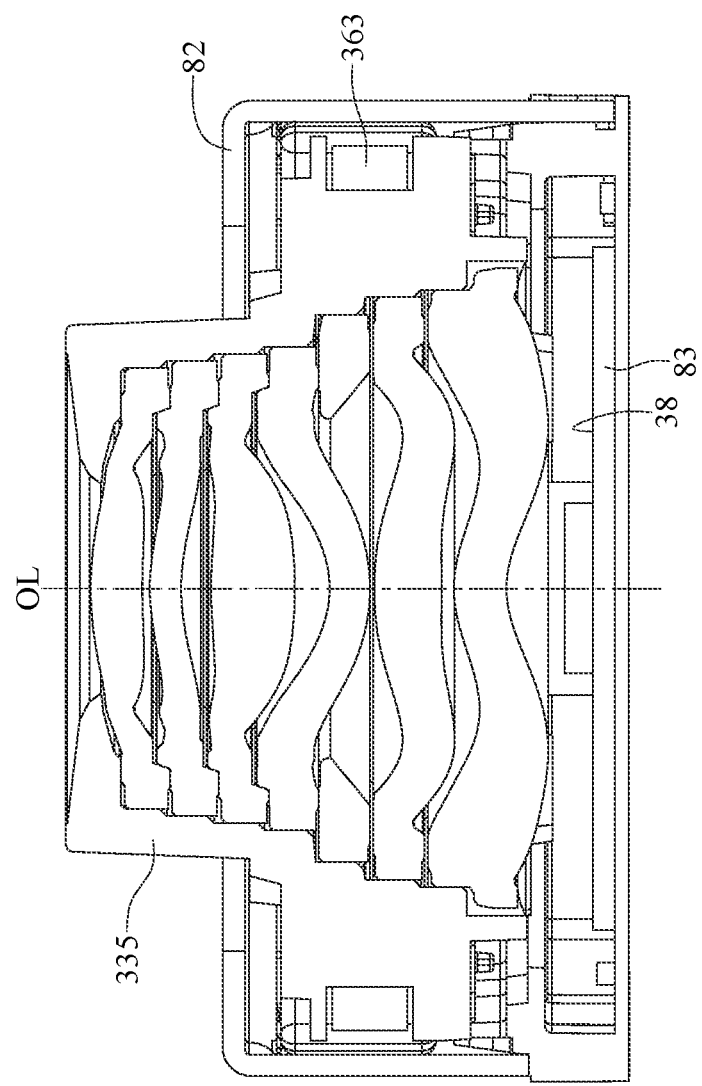
FIG. 21 is a cross-sectional view of the image capturing unit along line H-H' in FIG. 14.
Figure 22:
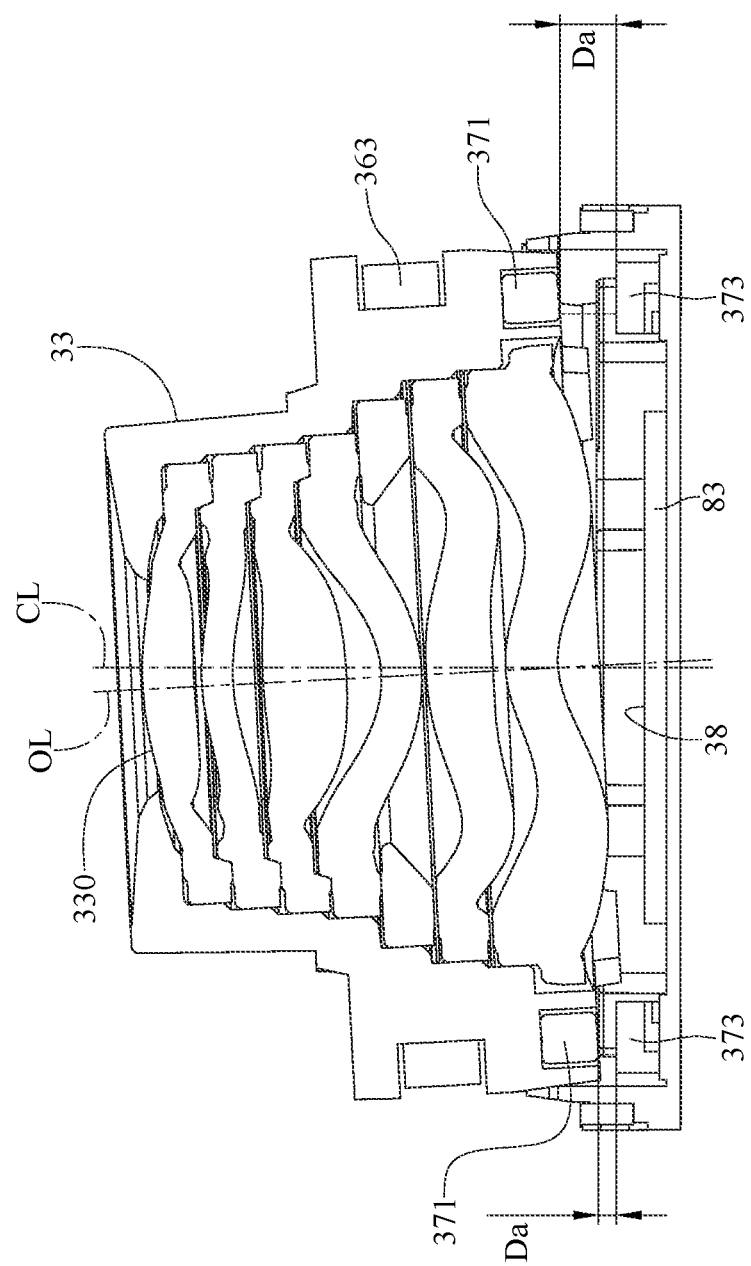
FIG. 22 is a cross-sectional view of the imaging camera driving module being inclined with respect to the image sensor and the base in FIG. 17.

16 is another exploded view of the image capturing unit in FIG. 14, FIG. 17 is a perspective view of an imaging camera driving module, an image sensor and a base of the image capturing unit in FIG. 14, FIG. 18 is a perspective view of the sectioned imaging camera driving module, image sensor and base along line E-E' in FIG. 17, FIG. 19 is a perspective view of the sectioned imaging camera driving module, image sensor and base along line F-F' in FIG. 17, FIG. 20 is a cross-sectional view of the image capturing unit along line G-G' in FIG. 14, FIG. 21 is a cross-sectional view of the image capturing unit along line H-H' in FIG. 14, and FIG. 22 is a cross-sectional view of the imaging camera driving module being inclined with respect to the image sensor and the base in FIG. 17.

In this embodiment, the image capturing unit includes an imaging camera driving module 3, a base 81, a casing 82 and an image sensor 83. The imaging camera driving module 3 includes a lens unit 33, an upper flat spring 34, two lower flat springs 35, a driving mechanism 36, a sensing mechanism 37 and an image surface 38.

The casing 82 is disposed on the base 81, and the lens unit 33 is movably disposed between the casing 82 and the base 81 via the upper flat spring 34 and the lower flat springs 35. Specifically, each of the upper flat spring 34 and the lower flat springs 35 includes an inner fixed part, an outer fixed part, and an elastic part connected to and located between the inner fixed part and the outer fixed part (their reference numerals are omitted). The inner fixed part of the upper flat spring 34 is fixed to the lens unit 33, and the outer fixed part of the upper flat spring 34 is fixed to the inside of the casing 82, so that the lens unit 33 is movable relative to the casing 82. Also, the inner fixed part of each lower flat spring 35 is fixed to the lens unit 33 and the outer fixed part of each lower flat spring 35 is fixed to the base 81, so that the lens unit 33 is movable relative to the base 81.

The lens unit 33 includes an imaging lens assembly 330 and a barrel 335 for holding the imaging lens assembly 330. The imaging lens assembly 330 has an optical axis OL, and the imaging lens assembly 330 includes a plurality of optical lens elements 331. The optical lens elements 331 include a maximum-diameter lens element 331a, and an outer diameter of the maximum-diameter lens element 331a is larger than outer diameters of the other optical lens elements 331b.

The image surface 38 is located on an image side of the imaging lens assembly 330, and the image surface 38 has a central axis CL in parallel with its normal line and passing through the geometric center thereof. The optical axis OL of the imaging lens assembly 330 passes through the image surface 38. The image sensor 83 is disposed on the base 81 and located on or near the image surface 38. In this embodiment, the maximum-diameter lens element 331a is closer to the image surface 38 than the other optical lens elements 331b to the image surface 38.

A shape of one side of the lens unit 33 facing toward the image side is octagonal, and the barrel 335 of the lens unit 33 is polygon-shaped with four chamfered corners 332. In addition, the lens unit 33 has four gate traces 333 respectively located at the four chamfered corners 332.

The driving mechanism 36 includes four driving magnets 361 and a coil 363. The driving magnets 361 are fixed to the upper flat spring 34 and together surround the lens unit 33, and the coil 363 is an annular coil surrounding and coupled to the barrel 335 of the lens unit 33. The driving magnets 361 are disposed corresponding to the coil 363, and the driving magnets 361 overlap the coil 363 in a direction perpendicular to and intersecting the optical axis OL. Therefore, a driving force can be generated by an electromagnetic interaction between the driving magnets 361 and the coils 363 to drive the lens unit 33 to move in a direction in parallel with the optical axis OL. In this embodiment, the four driving magnets 361 of the driving mechanism 36 are evenly distributed around the lens unit 33 to together generate a resultant force in the direction in parallel with the optical axis OL applied on the lens unit 33 so as to drive the lens unit 33 to move in the direction in parallel with the optical axis OL.

The sensing mechanism 37 includes two sensing magnets 371 and two sensing elements 373. The sensing magnets 371 are fixed to the barrel 335 of the lens unit 33, and the sensing elements 373 are disposed on the image side of the imaging lens assembly 330 and fixed to the base 81. The sensing elements 373 are respectively disposed corresponding to the sensing magnets 371, and there is an air gap formed between the sensing magnet 371 and the corresponding sensing element 373. Each of the sensing elements 373 is configured to detect a relative position of the sensing magnet corresponding thereto.

As shown in FIG. 22, when the optical axis OL of the imaging lens assembly 330 is at an angle relative to the central axis CL of the image surface 38, the imaging camera driving module 3 can detect a tilt of the optical axis OL with respect to the central axis CL by the sensing mechanism 37 and thereby obtain a tilt of the lens unit 33. Moreover, the tilt of the lens unit 33 can be obtained by detecting a tilt of a connection line of the two sensing magnets 371 intersecting the optical axis OL with respect to the central axis CL.

In this embodiment, the outer fixed part of the upper flat spring 34 can be, for example, clamped and fixed between the casing 82 and the driving magnets 361.

In this embodiment, the sensing magnets 371 are disposed in accommodation grooves 3351 of the barrel 335, at least a part of the barrel 335 is located between the sensing magnets 371 and the driving mechanism 36, and the sensing magnets 371 are blocked by the barrel 335 from facing the driving mechanism 36.

In this embodiment, the sensing magnets 371 respectively overlap the sensing elements 373 in a direction parallel to the optical axis OL, and the sensing magnets 371 overlap the coil 363 in the direction parallel to the optical axis OL.

A minimum distance in parallel with the central axis CL from one of the sensing magnets 371 to the sensing element 373 corresponding thereto is Da. In this embodiment, as shown in FIG. 22, when the optical axis OL of the imaging lens assembly 330 is at an angle relative to the central axis CL of the image surface 38, the following conditions are satisfied at two opposite sides of the image capturing unit, respectively: Da=0.12 mm; and Da=0.40 mm.

When the outer diameter of the maximum-diameter lens element 331a is φD, the following condition is satisfied: φD=4.5 mm.

When a minimum distance between the two sensing magnets 371 is d, the following condition is satisfied: d=4.87 mm.

When the outer diameter of the maximum-diameter lens element 331a is φD, and the minimum distance between the two sensing magnets 371 is d, the following conditions are satisfied: φD<d; and (d−φD)/2=0.19 mm.

When a height in parallel with the central axis CL of each of the sensing elements 373 is h, the following condition is satisfied: h=0.3 mm.

The minimum distance in parallel with the central axis CL from one of the sensing magnets 371 to the sensing element 373 corresponding thereto is Da, and the height in parallel with the central axis CL of each of the sensing elements 373 is h. In this embodiment, as shown in FIG. 22, when the optical axis OL of the imaging lens assembly 330 is at an angle relative to the central axis CL of the image surface 38, the following conditions are satisfied at two opposite sides of the image capturing unit, respectively: Da/h=0.40; and Da/h=1.33.

3rd Embodiment

Figure 23:
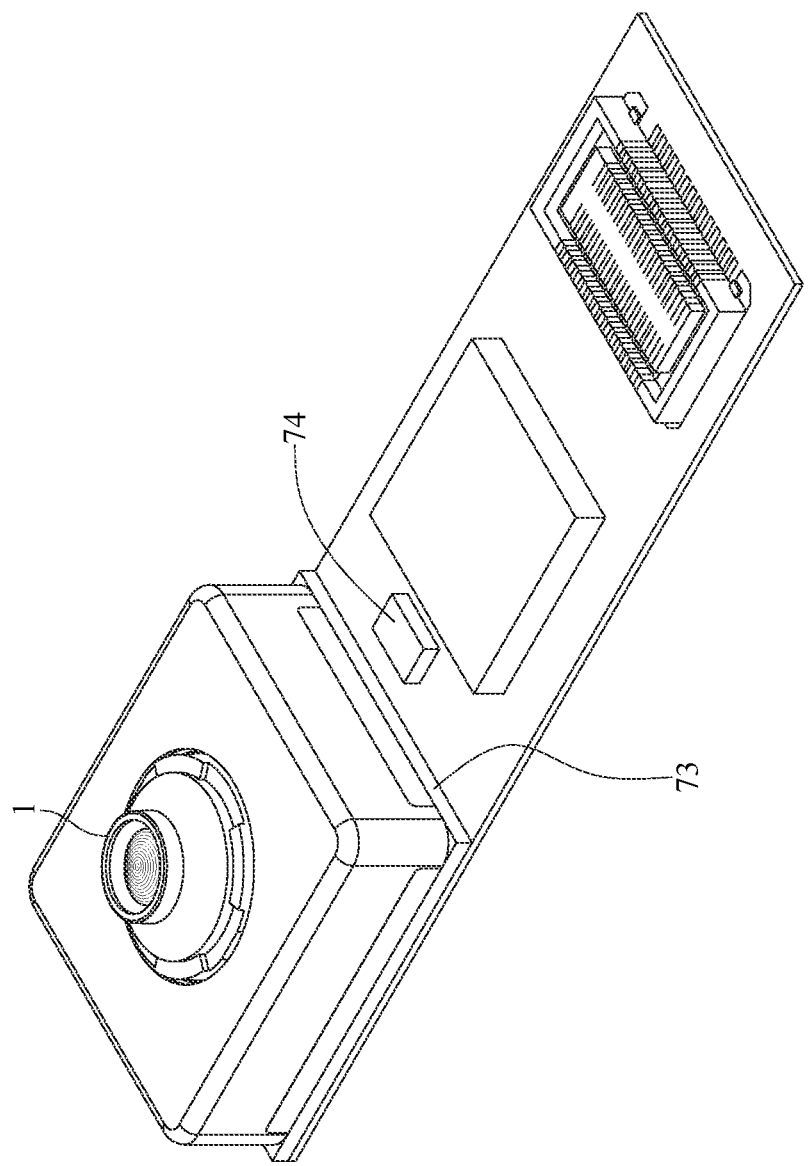
FIG. 23 is a perspective view of an image capturing unit according to the 3rd embodiment of the present disclosure.

Please refer to FIG. 23, which is a perspective view of an image capturing unit according to the 3rd embodiment of the present disclosure. In this embodiment, an image capturing unit 70 is a camera module including the imaging camera driving module 1 disclosed in the 1st embodiment, an image sensor 73 and an image stabilizer 74. However, in other configurations, the image capturing unit 70 may include the imaging camera driving module 3 disclosed in the 2nd embodiment, and the present disclosure is not limited thereto. The imaging light converges in the lens unit 13 of the imaging camera driving module 1 to generate an image with the driving mechanism 16 utilized for image focusing on the image surface 18 and the image sensor 73, and the generated image is then digitally transmitted to other electronic component for further processing.

The driving mechanism 16 is favorable for obtaining a better imaging position of the lens unit 13, so that a clear and sharp image of the imaged object can be captured by the lens unit 13 in different object distances. In addition, the image capturing unit 70 can be provided with the image sensor 73 (for example, CMOS or CCD), which can feature high photosensitivity and low noise, disposed on the image surface 18 of the imaging camera driving module 1 to provide higher image quality.

The image stabilizer 74, such as an accelerometer, a gyro sensor and a Hall Effect sensor, is configured to work with the driving mechanism 16 to provide optical image stabilization (OIS). The driving mechanism 16 working with the image stabilizer 74 is favorable for compensating for pan and tilt of the lens unit 13 to reduce blurring associated with motion during exposure. In some cases, the compensation can be provided by electronic image stabilization (EIS) with image processing software, thereby improving image quality while in motion or low-light conditions.

Figure 24:
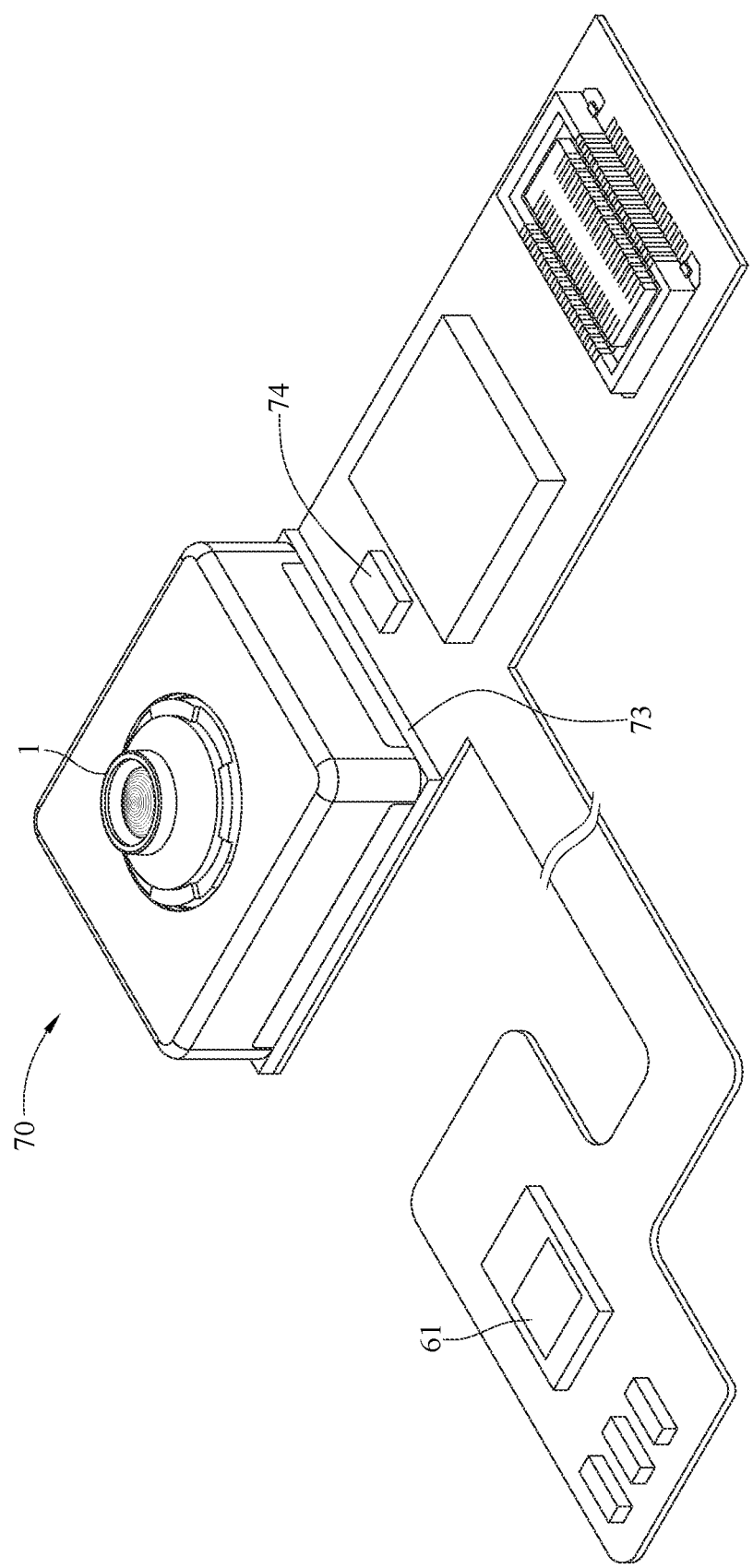
FIG. 24 is a perspective view of another image capturing unit according to one embodiment of the present disclosure.

The present disclosure is not limited to the image capturing unit 70 in FIG. 23. FIG. 24 is a perspective view of another image capturing unit according to one embodiment of the present disclosure, wherein the image capturing unit 70 further includes a flash module 61, which can be activated for light supplement when capturing images to improve image quality.

Figure 25:
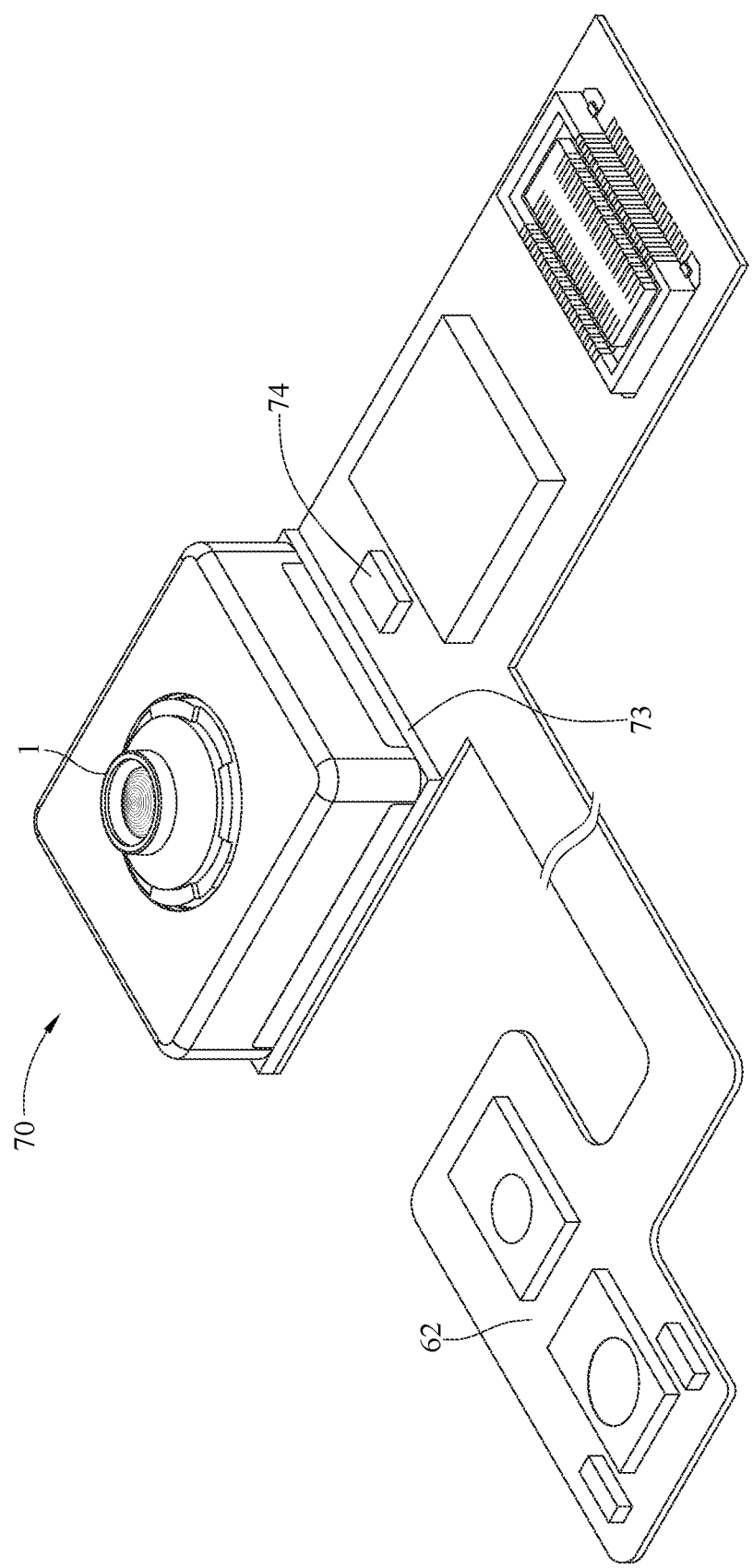
FIG. 25 is a perspective view of still another image capturing unit according to one embodiment of the present disclosure.

FIG. 25 is a perspective view of still another image capturing unit according to one embodiment of the present disclosure, wherein the image capturing unit 70 further includes a focus assist module 62 configured to detect an object distance to achieve fast auto focusing. The light beam emitted from the focus assist module 62 can be either conventional infrared or laser.

4th Embodiment

Figure 26:
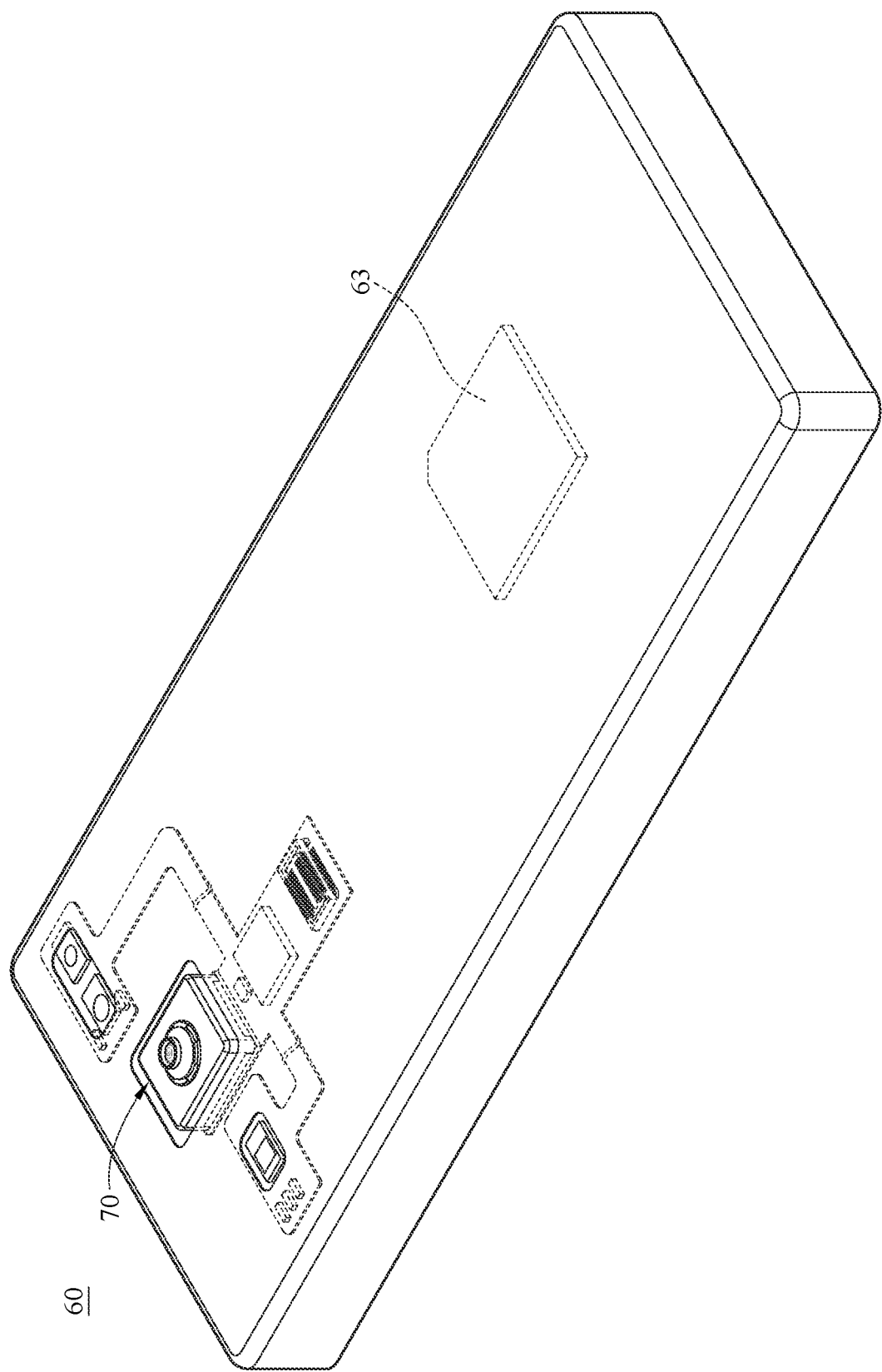
FIG. 26 is one perspective view of an electronic device according to the 4th embodiment of the present disclosure.
Figure 27:
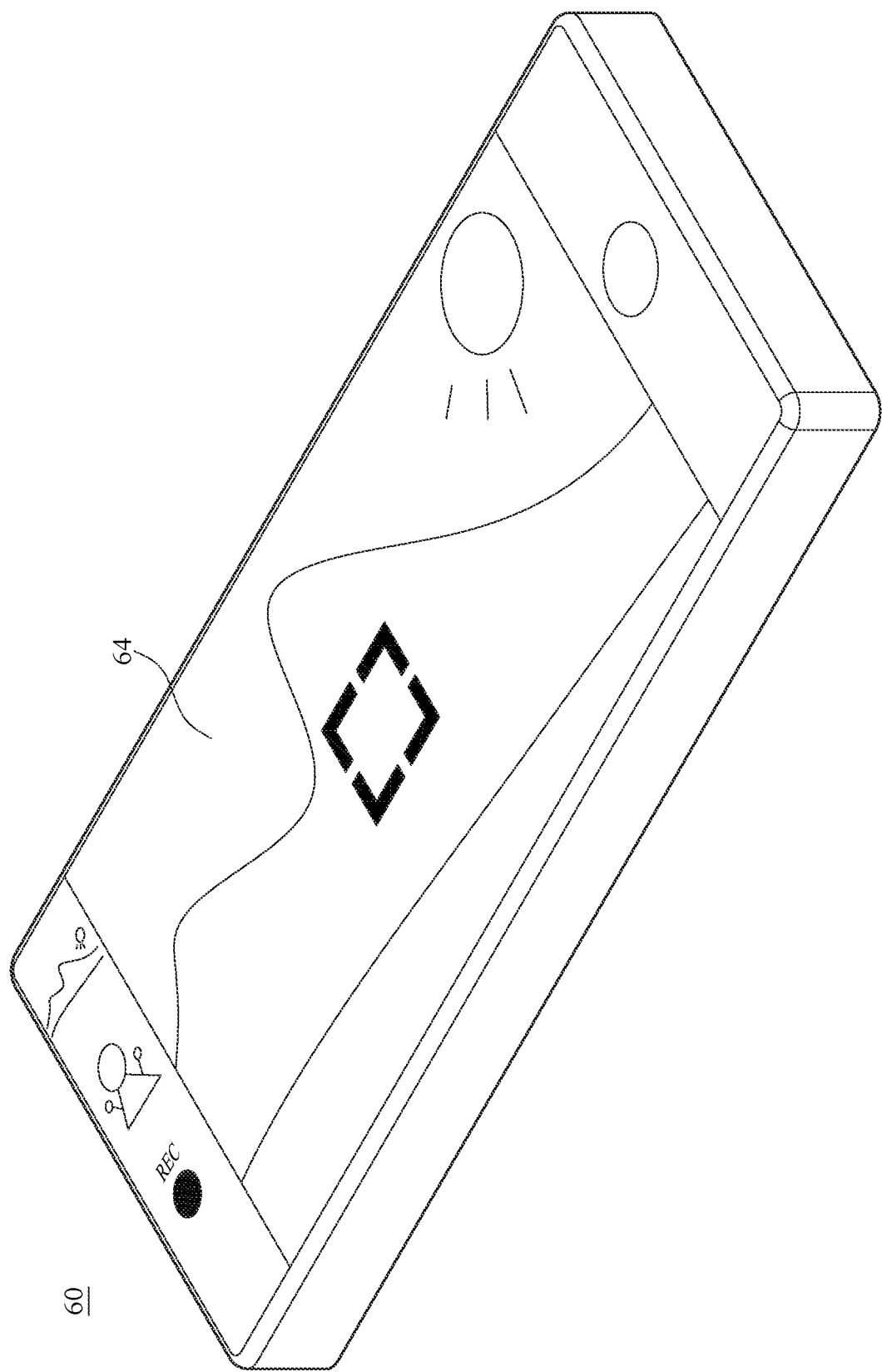
FIG. 27 is another perspective view of the electronic device in FIG. 26.
Figure 28:
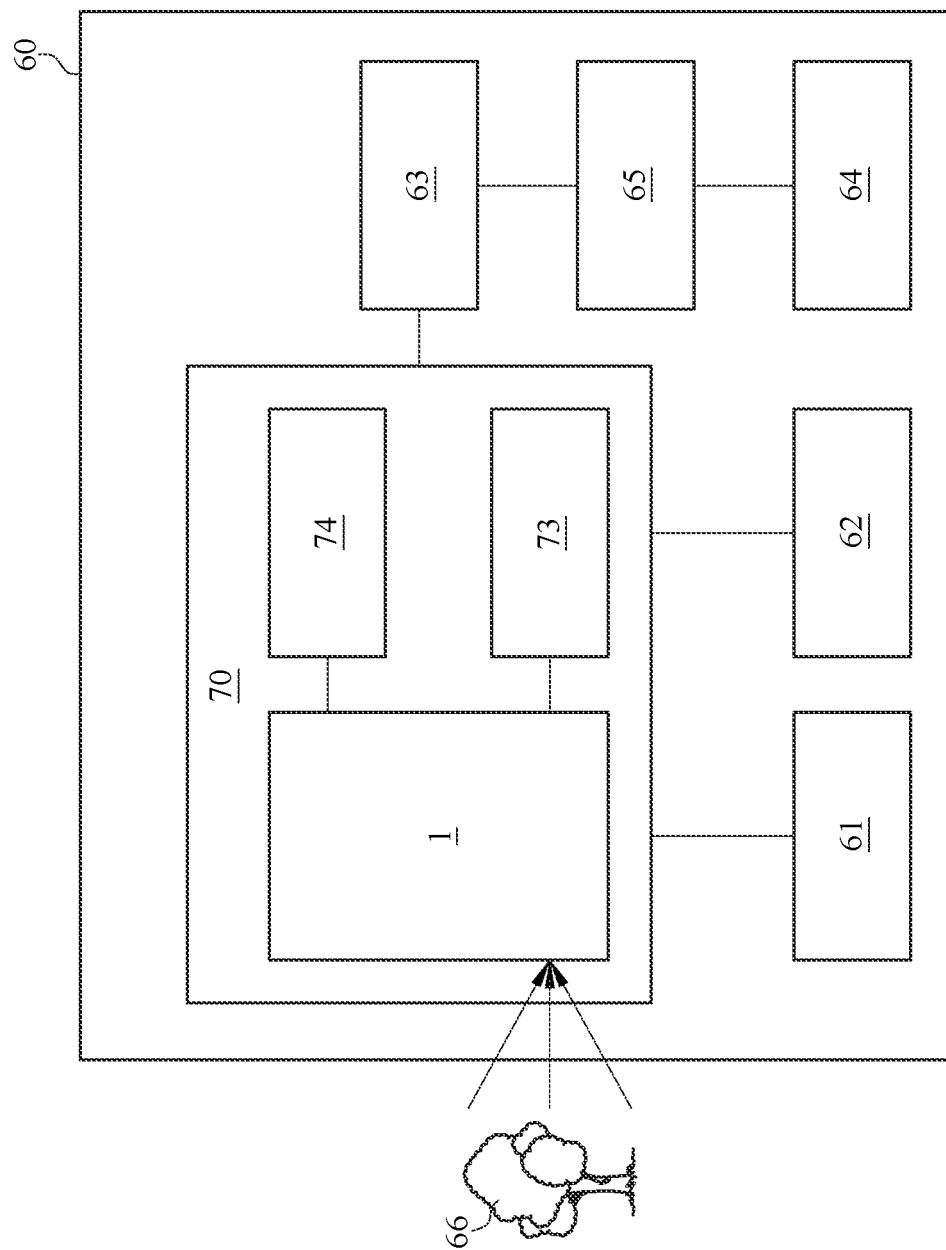
FIG. 28 is a block diagram of the electronic device in FIG. 26.

Please refer to FIG. 26 to FIG. 28. FIG. 26 is one perspective view of an electronic device according to the 4th embodiment of the present disclosure, FIG. 27 is another perspective view of the electronic device in FIG. 26, and FIG. 28 is a block diagram of the electronic device in FIG. 26.

In this embodiment, an electronic device 60 is a smartphone including the image capturing unit 70 disclosed in the 3rd embodiment, an image signal processor 63, a user interface 64 and an image software processor 65. In this embodiment, the image capturing unit 70 includes the imaging camera driving module 1, the image sensor 73, the image stabilizer 74, the flash module 61 and the focus assist module 62.

When a user captures images of an object 66, the light rays converge in the image capturing unit 70 to generate an image(s), and the flash module 61 is activated for light supplement. The focus assist module 62 detects the object distance of the imaged object 66 to achieve fast auto focusing. The image signal processor 63 is configured to optimize the captured image to improve image quality. The light beam emitted from the focus assist module 62 can be either conventional infrared or laser. The user interface 64 can be a touch screen or have a physical shutter button. The user is able to interact with the user interface 64 and the image software processor 65 having multiple functions to capture images and complete image processing. The image processed by the image software processor 65 can be displayed on the user interface 64.

Figure 29:
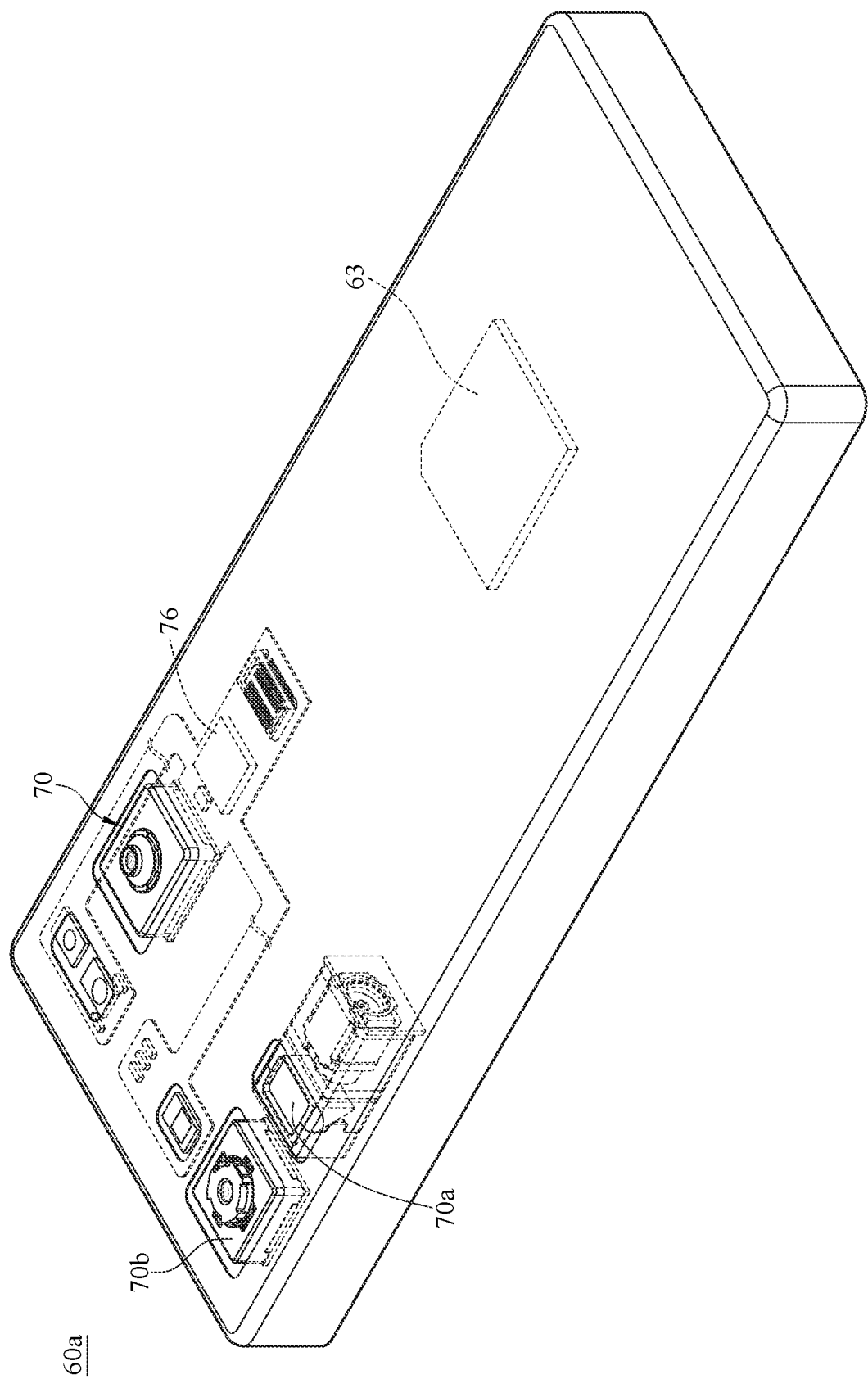
FIG. 29 is a perspective view of another electronic device according to one embodiment of the present disclosure.

The electronic device of the present disclosure is not limited to the number of image capturing units as described above. FIG. 29 is a perspective view of another electronic device according to one embodiment of the present disclosure. An electronic device 60a is similar to the electronic device 60, and the electronic device 60a further includes an image capturing unit 70a and an image capturing unit 70b. The image capturing unit 70, the image capturing unit 70a and the image capturing unit 70b all face the same direction and each has a single focal point. In addition, the image capturing unit 70, the image capturing unit 70a and the image capturing unit 70b have different fields of view (e.g., the image capturing unit 70a is a telephoto image capturing unit, the image capturing unit 70b is a wide-angle image capturing unit, and the image capturing unit 70 has a field of view ranging between the image capturing unit 70a and the image capturing unit 70b), such that the electronic device 60a has various magnification ratios so as to meet the requirement of optical zoom functionality. Furthermore, in this embodiment, the image capturing unit 70 further includes an expansion image signal processor 76. When the image capturing unit 70 works with the telephoto image capturing unit 70a and wide-angle image capturing unit 70b, the expansion image signal processor 76 provides zoom functionality for images on the touch screen so as to meet image processing requirements for multiple image capturing units. The electronic device 60a equipped with the image capturing unit 70 has various modes of different photographing functions, such as zoom function, telephotography, multi-camera recording, selfie-optimized function, and high dynamic range (HDR) and 4 K resolution imaging under low-light conditions.

The smartphone in this embodiment is only exemplary for showing the imaging camera driving modules 1 and 3 of the present disclosure installed in an electronic device, and the present disclosure is not limited thereto. The imaging camera driving modules 1 and 3 can be optionally applied to optical systems with a movable focus. Furthermore, the imaging camera driving modules 1 and 3 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging camera driving module, comprising:
    a lens unit, comprising:
        an imaging lens assembly, having an optical axis;
        a driving mechanism, wherein at least a part of the driving mechanism is coupled to the lens unit, and the driving mechanism is configured to drive the lens unit to move in a direction parallel to the optical axis;
    a sensing mechanism, comprising:
        a plurality of sensing magnets, fixed to the lens unit, wherein at least a part of the lens unit is located between the plurality of sensing magnets and the driving mechanism, and the plurality of sensing magnets are blocked by the at least a part of the lens unit from facing the driving mechanism; and
        a plurality of sensing elements, disposed on an image side of the imaging lens assembly and on an image side of the plurality of sensing magnets, wherein each of the plurality of sensing elements is disposed corresponding to one of the plurality of sensing magnets, and each of the plurality of sensing elements is configured to detect a relative position of the sensing magnet corresponding thereto; and
    an image surface, having a central axis, wherein the image surface is disposed on the image side of the imaging lens assembly, and the optical axis of the imaging lens assembly passes through the image surface;
    wherein a minimum distance in parallel with the central axis from one of the plurality of sensing magnets to the sensing element corresponding thereto is Da, and the following condition is satisfied:

$0 \text{ mm} \le Da \le 0.93 \text{ mm}$.

2. The imaging camera driving module of claim 1, wherein the imaging lens assembly comprises a plurality of optical lens elements, the plurality of optical lens elements comprise a maximum-diameter lens element, an outer diameter of the maximum-diameter lens element is larger than outer diameters of other optical lens elements, the outer diameter of the maximum-diameter lens element is ΦD, and the following condition is satisfied:

$6 \text{ mm} < \Phi D < 20 \text{ mm}$.

3. The imaging camera driving module of claim 2, wherein a number of the plurality of sensing magnets is two, the outer diameter of the maximum-diameter lens element is ΦD, a minimum distance between the two sensing magnets is d, and the following condition is satisfied:

$\Phi D < d$.

4. The imaging camera driving module of claim 3, wherein the minimum distance between the two sensing magnets is d, the outer diameter of the maximum-diameter lens element is ΦD, and the following condition is satisfied:

$0.05 \text{ mm} < (d - \Phi D)/2 < 1.0 \text{ mm}$.

5. The imaging camera driving module of claim 3, wherein the minimum distance between the two sensing magnets is d, the outer diameter of the maximum-diameter lens element is ΦD, and the following condition is satisfied:

$0.05 \text{ mm} \le (d - \Phi D)/2 \le 0.8 \text{ mm}$.

6. The imaging camera driving module of claim 1, wherein the plurality of sensing magnets respectively overlap the plurality of sensing elements in a direction parallel to the optical axis.

7. The imaging camera driving module of claim 1, wherein the driving mechanism comprises at least one driving magnet and at least one coil, the at least one driving magnet and the at least one coil are disposed corresponding to each other, the driving mechanism drives the lens unit to move in the direction parallel to the optical axis by a driving force generated between the at least one driving magnet and the at least one coil, and one of the at least one driving magnet and the at least one coil is coupled to the lens unit.

8. The imaging camera driving module of claim 7, wherein the plurality of sensing magnets and the at least one coil are alternatively disposed in a circumferential direction about the optical axis.

9. The imaging camera driving module of claim 7, wherein the plurality of sensing magnets overlap the at least one coil in a direction parallel to the optical axis.

10. The imaging camera driving module of claim 1, wherein a height in parallel with the central axis of each of the plurality of sensing elements is h, and the following condition is satisfied:

$0.01 \text{ mm} < h < 0.9 \text{ mm}$.

11. The imaging camera driving module of claim 10, wherein the minimum distance in parallel with the central axis from each of the plurality of sensing magnets to the sensing element corresponding thereto is Da, the height in parallel with the central axis of each of the plurality of sensing elements is h, and the following condition is satisfied:

$0.01 < Da/h \le 4.0$.

12. The imaging camera driving module of claim 1, wherein a shape of one side of the lens unit facing toward an image side is polygonal.

13. The imaging camera driving module of claim 12, wherein the side of the lens unit facing toward the image side is polygon-shaped with chamfered corners.

14. The imaging camera driving module of claim 13, wherein the lens unit has at least two gate traces, and the at least two gate traces are respectively located at the chamfered corners.

15. An electronic device, comprising:
    the imaging camera driving module of claim 1.

* * * * *